United States Patent
Axmon et al.

(10) Patent No.: US 9,516,654 B2
(45) Date of Patent: Dec. 6, 2016

(54) CELLULAR COMMUNICATION SYSTEM SUPPORT FOR LIMITED BANDWIDTH COMMUNICATION DEVICES

(71) Applicant: Telefonaktiebolaget L M Ericsson (publ), Stockholm (SE)

(72) Inventors: Joakim Axmon, Kavlinge (SE); Erik Eriksson, Linkoping (SE); Bengt Lindoff, Bjarred (SE); Anders Wallen, Ystad (SE); Leif Wilhelmsson, Dalby (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 26 days.

(21) Appl. No.: 14/464,425

(22) Filed: Aug. 20, 2014

(65) Prior Publication Data
US 2014/0357272 A1 Dec. 4, 2014

Related U.S. Application Data

(62) Division of application No. 13/398,786, filed on Feb. 16, 2012, now Pat. No. 8,848,638.

(60) Provisional application No. 61/501,310, filed on Jun. 27, 2011.

(51) Int. Cl.
*H04W 4/00* (2009.01)
*H04W 72/04* (2009.01)
(Continued)

(52) U.S. Cl.
CPC ........ *H04W 72/0493* (2013.01); *H04L 5/0053* (2013.01); *H04W 48/12* (2013.01); *H04W 48/16* (2013.01); *H04L 5/00* (2013.01)

(58) Field of Classification Search
CPC ............... H04W 48/12; H04W 48/16; H04W 72/0493; H04L 5/0053; H04L 5/00
USPC .......................... 370/331, 338, 329, 330, 328
See application file for complete search history.

(56) References Cited

U.S. PATENT DOCUMENTS

2007/0230388 A1 10/2007 Li et al.
2008/0108353 A1* 5/2008 Lee .................. H04W 36/0061
455/437

(Continued)

FOREIGN PATENT DOCUMENTS

GB 2 358 327 A 7/2001
GB 2 428 537 A 1/2007

(Continued)

OTHER PUBLICATIONS

3GPP TS 36.201, V10.0.0 Technical Specification Group Radio Access Network; Evolved Universal Terrestrial Radio Access (E-UTRA); LTE physical layer; General Description (Release 10), Dec. 2010.

(Continued)

*Primary Examiner* — Chuong T Ho
(74) *Attorney, Agent, or Firm* — Leffler Intellectual Property Law, PLLC; Kenneth B. Leffler

(57) ABSTRACT

A network node that serves a host cell in a cellular communication system transmits, at (a) first time interval(s), first control channel information on a control channel that extends over a first bandwidth of a radiofrequency spectrum. The first control channel communicates information necessary to enable a first type of communication device to receive data from the host cell. The first type of communication device can receive first bandwidth-wide signals. At (a) second time interval(s), second control channel information is transmitted on a second control channel of a first M-cell. The second control channel occupies a second bandwidth that is smaller than the first bandwidth. The second time interval(s) do(es) not coincide with any of the first time interval(s). A second type of communication device having reduced receive bandwidth capabilities compared to those of the first type of communication device is thereby made capable of being served by the node.

8 Claims, 18 Drawing Sheets

(51) Int. Cl.
*H04W 48/12* (2009.01)
*H04W 48/16* (2009.01)
*H04L 5/00* (2006.01)

(56) References Cited

U.S. PATENT DOCUMENTS

| | | |
|---|---|---|
| 2008/0212546 A1 | 9/2008 | Fischer |
| 2010/0118773 A1 | 5/2010 | Kawamura et al. |
| 2010/0260081 A1 | 10/2010 | Damnjanovic et al. |
| 2011/0149890 A1 | 6/2011 | Chun et al. |
| 2011/0235602 A1* | 9/2011 | Ji .................. H04L 5/0007 370/329 |
| 2011/0299474 A1 | 12/2011 | Li et al. |
| 2011/0310854 A1 | 12/2011 | Zou et al. |
| 2012/0015653 A1* | 1/2012 | Paliwal ............. H04W 24/10 455/435.1 |
| 2012/0165053 A1 | 6/2012 | Yoon et al. |
| 2012/0281647 A1 | 11/2012 | Kuo et al. |
| 2012/0327895 A1 | 12/2012 | Wallen et al. |
| 2013/0201848 A1 | 8/2013 | Kazmi et al. |
| 2013/0242937 A1 | 9/2013 | Li et al. |
| 2014/0112280 A1 | 4/2014 | Lee et al. |
| 2014/0119332 A1 | 5/2014 | Kim et al. |

FOREIGN PATENT DOCUMENTS

| | | |
|---|---|---|
| KR | 2010/043483 A | 4/2010 |
| WO | 2010/049754 A1 | 5/2010 |
| WO | 2010/075819 A1 | 7/2010 |
| WO | 2012/104630 A1 | 8/2012 |

OTHER PUBLICATIONS

Chen et a. "Machine-to-Machine communication in LTE-A" VTC, Fall 2010, Sep. 6-9, 2010, pp. 1-4, ISSN: 1090-3038.
PCT International Search Report, mailed Jan. 18, 2013, in connection with International Application No. PCT/EP2012/061969.
PCT Written Opinion, mailed Jan. 18, 2013, in connection with International Application No. PCT/EP2012/061969.
PCT Partial Search Report and Invitation to Pay Fees, dated Oct. 4, 2012, in connection with counterpart International Application No. PCT/EP2012/061969.
PCT Search Report, mailed Oct. 25, 2012, in connection with International Application No. PCT/EP2012/061982.
PCT Written Opinion, mailed Oct. 25, 2012, in connection with International Application No. PCT/EP2012/061982.
U.S. Appl. No. 61/482,100, filed May 3, 2011.
Ipwireless Inc. "Proposal for a study item in support of low complexity LTE devices for MTC" 3GPP Draft R2-11974, 3GPP Mobile Competence Centre, 650 Route Des Lucioles, F-06921 Sophia-Antipolis Cedex, France, RAN WG2, Barcelona, Spain, Apr. 29, 2011, XP050494837.

* cited by examiner

FIG. 1 (PriorArt)

CELLULAR COMMUNICATION SYSTEM SUPPORT FOR LIMITED BANDWIDTH COMMUNICATION DEVICES

CROSS REFERENCE TO RELATED APPLICATIONS

This application claims the benefit of U.S. Pat. No. 8,848,638, filed Feb. 16, 2012 and issued on Sep. 30, 2014, which claims the benefit of U.S. Provisional Application No. 61/501,310, filed Jun. 27, 2011, which applications are both hereby incorporated herein by reference in their entireties. This application is also related to U.S. application Ser. No. 13/398,787, filed on Feb. 16, 2012, entitled "Cellular Communication System Support for Limited Bandwidth Communication Devices", and naming Joakim Axmon, Erik Eriksson, Bengt Lindoff, Anders Wallén, and Leif Wilhelmsson as inventors, which is hereby incorporated herein by reference in its entirety.

BACKGROUND

The present invention relates to cellular communication systems, and more particularly to support for both full-bandwidth and limited-bandwidth devices in a cellular communication system.

Cellular communication systems typically comprise a land-based network that provides wireless coverage to mobile terminals that can continue to receive service while moving around within the network's coverage area. The term "cellular" derives from the fact that the entire coverage area is divided up into so-called "cells", each of which is typically served by a particular radio transceiver station (or equivalent) associated with the land-based network. Such transceiver stations are often referred to as "base stations". As the mobile device moves from one cell to another, the network hands over responsibility for serving the mobile device from the presently-serving cell to the "new" cell. In this way, the user of the mobile device experiences continuity of service without having to reestablish a connection to the network. FIG. 1 illustrates a cellular communication system providing a system coverage area 101 by means of a plurality of cells 103.

The radiofrequency spectrum that is utilized to provide mobile communication services is a limited resource that must be shared in some way among all of the users in a system. Therefore, a number of strategies have been developed to prevent one mobile device's use (both transmitting and receiving) of radio spectrum from interfering with that of another, as well as to prevent one cell's communications from interfering with those of another. Some strategies, such as Frequency Division Multiple Access (FDMA) involve allocating certain frequencies to one user to the exclusion of others. Other strategies, such as Time Division Multiple Access (TDMA) involve allowing multiple users to share one or more frequencies, with each user being granted exclusive use of the frequencies only at certain times that are unique to that user. FDMA and TDMA strategies are not mutually exclusive of one another, and many systems employ both strategies together, one example being the Global System for Mobile communication (GSM).

As designers strive to develop systems with higher and higher capabilities (e.g., higher communication speeds, resistance to interference, higher system capacity, etc.), different technical features are incorporated, including different means for sharing radiofrequency resources. To take one of a number of possible examples, the Evolved-Universal Terrestrial Radio Access Network (E-UTRAN) Long Term Evolution (LTE) technology, as defined by 3GPP TR 36.201, "Evolved Universal Terrestrial Radio Access (E-UTRA); Long Term Evolution (LTE) physical layer; General description" will be able to operate over a very wide span of operating bandwidths and also carrier frequencies. Furthermore, E-UTRAN systems will be capable of operating within a large range of distances, from microcells (i.e., cells served by low power base stations that cover a limited area, such as a shopping center or other building accessible to the public) up to macrocells having a range that extends up to 100 km. In order to handle the different radio conditions that may occur in the different applications, Orthogonal Frequency Division Multiple Access (OFDMA) technology is used in the downlink (i.e., the communications link from the base station to the User Equipment—"UE") because it is a radio access technology that can adapt very well to different propagation conditions. In OFDMA, the available data stream is portioned out into a number of narrowband subcarriers that are transmitted in parallel. Because each subcarrier is narrowband it only experiences flat-fading. This makes it very easy to demodulate each subcarrier at the receiver.

Machine type communication (MTC) over LTE is increasingly gaining attention as operators are planning for replacement of older communication systems, like GSM, by LTE networks. MTC devices, such as connected sensors, alarms, remote control devices and the like, are common in GSM networks where they co-exist with more conventional UEs (e.g., mobile phones). MTC devices are generally characterized by a modest bit rate and sparse communication activity. The number of MTC devices is expected to increase dramatically during the next few years.

In release 8/9 versions of LTE, the supported cell bandwidth is within the range of about 1.4 to 20 MHz (6 and 100 resource blocks (RBs) in LTE terminology), LTE's Physical Downlink Control Channel (PDCCH) extends over the full cell bandwidth, which means that all UEs have to support reception over the full cell bandwidth in order receive control information. The control channel carries information identifying where in the radiofrequency spectrum the UE can receive information on the data channel (Physical Downlink Shared Channel—"PDSCH"), if any such information is transmitted to the UE or broadcasted to multiple UEs in the subframe (1 ms period).

LTE Release 8 already supports time-domain multiplexing on a subframe basis between unicast and multicast signaling of subframes used for Multimedia Broadcast via Single Frequency Network (MBSFN) in order to allow MBSFN to be introduced in later releases without negatively impacting legacy terminals. Any terminal designed in accordance with earlier versions of LTE (a "legacy terminal") does not support MBSFN but does recognize that subframes signaled as being MBSFN subframes contain nothing for the terminal to receive, and hence reception can be avoided in those subframes. One exception is the first OFDM symbol in the subframe which carries cell-specific reference signals (CRS), which may be used by the terminal (e.g. for channel estimation or for measurements (e.g. Radio Link Monitoring—"RLM" or Reference Signal Received Power—"RSRP"), particularly when adjacent to normal subframes. MBSFN subframes are now being discussed for use not only for multicast operation, but in the context of relaying and improved measurements in heterogeneous network deployment scenarios along with Almost Blank Subframes (ABS).

MTC devices utilizing a cellular system for communication have become increasingly popular. The notion of developing an MTC device that is capable of communicating by means of communication systems such as LTE presents problems, however, because meeting the existing LTE requirements would cause an MTC device to be more costly and to consume more power than it would ordinarily require to satisfy its own quality of service requirements. As mentioned above, an MTC device typically requires only a low data rate for signaling a small amount of data. One example of an MTC device category is sensory equipment. An important requirement of such devices is that they should have low cost as well as low power consumption. Examples of cellular system parameters that typically drive cost and power consumption are the system bandwidth as well as response time. Using LTE as defined according to current standardization releases requires that a device support a system bandwidth that is up to 20 MHz. Supporting such a large bandwidth would increase the cost for LTE MTC devices, and such support would essentially be unnecessary from the MTC device's point of view because only a small system bandwidth (e.g., up to some few MHz) is required to support the MTC device's relatively low data rate.

Furthermore, LTE has short response time requirements, in terms of a short amount of time for issuing a Hybrid Automatic Repeat Request (HARQ) response, as well as a short time interval between the control signaling (indicating that data information is forthcoming) and the actual transmission of the data information. (In LTE systems, the PDCCH points out data in the PDSCH that is included in the same subframe as the PDCCH). Satisfying these time requirements imposes high requirements on the processing speed (which drives power) and/or the need for parallel processing (increasing baseband chip area and thereby the cost). MTC devices supporting low data rates and with low power requirements optimally should use long response times (e.g., a longer time for decoding of control information and data) in order to reduce the required clocking speed or parallel processing requirements.

The points raised above show why it is beneficial to restrict MTC devices to operate at system bandwidths that are lower than 20 MHz. But it would be too restrictive to require that all cellular networks limit themselves to using only small bandwidths if they are support power and cost efficient MTC devices.

Presently, there is an incompatibility between MTC devices supporting only a low bandwidth and/or having insufficient decoding performance (e.g., requirements of a longer delay between the PDCCH and the possible data on the PDSCH) which prevents such devices from being able to connect to an LTE system as it is presently defined by the Third Generation Partnership Project (3GPP) standard. While such MTC devices would be able to perform a cell search and receive a Master Information Block (MIB) on just a 1.4 MHz bandwidth, camping on a conventional LTE cell would still not be possible because being able to receive the further broadcast information (e.g., a System Information Block—"SIB") that is required for the MTC device to be able to, for example, perform a random access via the Random Access Channel (RACH) requires that the MTC device be capable of supporting the full LTE bandwidth and also that the MTC device be able to decode the PDCCH and the PDSCH without any additional delay restrictions compared to the current standard.

It is therefore desirable to have methods and apparatuses that enable an MTC device to retain its relatively low performance characteristics (e.g., in terms of size of bandwidth supported and/or processing power) and yet be capable of connecting to a modern-day cellular communications system, such as but not limited to an LTE system, that ordinarily imposes higher performance requirements on connecting devices.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in, for example, methods and apparatuses for operating a network node that serves a host cell in a cellular communication system. Such operation comprises, at one or more first time intervals, transmitting first control channel information on a control channel that extends over a first bandwidth of a radiofrequency spectrum, wherein the first control channel communicates information that is necessary to enable a first type of communication device to receive data from the host cell, the first type of communication device being capable of receiving a signal having the first bandwidth of the radiofrequency spectrum. At one or more second time intervals, second control channel information is transmitted on a second control channel of a first M-cell, wherein the second control channel occupies a second bandwidth of the radiofrequency spectrum, and wherein the second bandwidth is smaller than the first bandwidth, and wherein the one or more second time intervals do not coincide with any of the one or more first time intervals, whereby a second type of communication device having reduced receive bandwidth capabilities compared to those of the first type of communication device is made capable of being served by the network node.

In an aspect of some embodiments, the second bandwidth of the radiofrequency spectrum is frequency-wise located within a frequency-wise location of the first bandwidth of the radiofrequency spectrum.

In an aspect of some embodiments, operation includes transmitting information to the second type of communication device, wherein the information informs what the one or more second time intervals are.

In an aspect of some embodiments, operation includes transmitting information to the second type of communication device, wherein the information informs on what part of the radiofrequency spectrum the second bandwidth of the radiofrequency spectrum is located. As a non-limiting example, the information that informs on what part of the radiofrequency spectrum the second bandwidth of the radiofrequency spectrum is located is transmitted on a channel that occupies a third bandwidth of the radiofrequency spectrum, wherein the third bandwidth is smaller than the first bandwidth, and a frequency-wise location of the second bandwidth of the radiofrequency spectrum differs from a frequency-wise location of the third bandwidth of the radiofrequency spectrum.

In an aspect of some embodiments, an air interface of the cellular communication system is divided up into sequentially occurring frames, each of the frames comprising a plurality of sequentially occurring subframes; and the one or more first time intervals occur at one or more subframes within a frame; and the one or more second time intervals occur at one or more different subframes within the frame, wherein the one or more different subframes are not used for transmitting any information on the control channel that extends over the first bandwidth of the radiofrequency spectrum. In some exemplary alternatives of these embodiments:

the second control channel information transmitted in one of the one or more different subframes within the frame indicates one or more time intervals and/or frequencies within the one of the one or more different subframes that are used as respective one or more downlink physical data channels for the second type of communication device;

the second control channel information transmitted in one of the one or more different subframes within the frame indicates one or more time intervals and/or frequencies within a later one of the one or more different subframes that are used as respective one or more downlink physical data channels for the second type of communication device; or operation comprises sending a signal to the first type of communication device that results in the first type of communication device not attempting to receive the first control channel during the one or more different subframes.

In an aspect of some embodiments, an air interface of the cellular communication system is divided up into sequentially occurring frames, each of the frames comprising a plurality of sequentially occurring subframes; the one or more first time intervals occur during one or more subframes within a frame; the one or more second time intervals occur at different times within the one or more subframes within the frame; and none of the one or more first time intervals coincides with any of the one or more second time intervals.

In an aspect of some embodiments, operation includes transmitting system information that informs the second type of communication device of one or more of:

random access parameters for use when accessing a random access channel of the first M-cell;

a subframe pattern of M-cells, wherein each M-cell associated with the subframe pattern is a reserved portion of the radiofrequency spectrum having the second bandwidth;

a subframe pattern of host cells; and information from which the subframe pattern of host cells can be deduced.

In an aspect of some embodiments, operation includes receiving a random access transmission; and ascertaining that the random access transmission came from the second type of communication device and in response thereto, enabling the second type of communication device to locate an M-cell by sending information to the second type of communication device that identifies a time- and/or frequency-wise location of the second bandwidth of the radiofrequency spectrum.

In an aspect of some embodiments, operation includes, at one or more third time intervals, transmitting third control channel information on a third control channel of the first M-cell, wherein the third control channel information is intended for receipt by the second type of communication device, and wherein the one or more third time intervals do not coincide with any of the one or more first time intervals or any of the one or more second time intervals.

In an aspect of some embodiments, an air interface of the cellular communication system is divided up into sequentially occurring frames, each of the frames comprising a plurality of sequentially occurring subframes, and wherein the one or more second time intervals occur at one or more subframes within a frame, and wherein the one or more third time intervals occur at one or more different time intervals within the subframe.

In an aspect of some embodiments, an air interface of the cellular communication system is divided up into sequentially occurring frames, each of the frames comprising a plurality of sequentially occurring subframes; and the one or more second time intervals occur at one or more subframes within a frame; and the one or more third time intervals occur at one or more different time intervals within a different subframe within the frame.

In an aspect of some embodiments an air interface of the cellular communication system is divided up into sequentially occurring frames, each of the frames comprising a plurality of sequentially occurring subframes; the one or more second time intervals occur during one or more subframes within a frame; and operation includes, at one or more third time intervals, transmitting third control channel information on a third control channel of a second M-cell, wherein the third control channel occupies a third bandwidth of the radiofrequency spectrum, and wherein the third bandwidth is smaller than the first bandwidth, and wherein the one or more third time intervals occur during the one or more subframes within the frame and coincide with one or more of the second time intervals, whereby a different second type of communication device having reduced receive bandwidth capabilities compared to those of the first type of communication device is made capable of being served by the network node, wherein a frequency-wise location of the second bandwidth of the radiofrequency spectrum does not overlap a frequency-wise location of the third bandwidth of the radiofrequency spectrum.

In an aspect of some embodiments, operation includes using a first hybrid automatic repeat request (HARQ) protocol when communicating with the first type of communication device; and using a second HARQ protocol when communicating with the second type of communication device, wherein one or more timing requirements of the first HARQ protocol is/are different from one or more timing requirements of the second HARQ protocol.

In an aspect of some embodiments, operation includes transmitting information that identifies capabilities related to the second type of communication device that the host cell supports.

In accordance with other aspects of the present invention, the foregoing and other objects are achieved in, for example, methods and apparatuses for controlling a communication device in a cellular communication system, wherein the communication device has radio equipment that operates on no more than a predefined bandwidth of a radiofrequency spectrum. Such operation comprises operating the radio equipment to perform a cell search procedure in a first region of the radiofrequency spectrum, wherein the first region has a bandwidth that is no greater than the predefined bandwidth. After finding a cell in the cellular communication system, the radio equipment is tuned to cause the radio equipment to operate in a second region of the radiofrequency spectrum, wherein the second region has a bandwidth that is no greater than the predefined bandwidth. While tuned to the second region of the radiofrequency spectrum, the radio equipment is operated to receive system information being transmitted by the cellular communication system; and the radio equipment is tuned to cause the radio equipment to operate in a third region of the radiofrequency spectrum, wherein at least one of the second and third regions of the radiofrequency spectrum is different than the first region of the radio frequency spectrum.

In an aspect of some embodiments, after finding the cell in the cellular communication system, tuning the radio equipment to cause the radio equipment to operate in the second region of the radiofrequency spectrum comprises receiving information transmitted in the first region of the radiofrequency spectrum, wherein the information directly or indirectly informs the communication device about a frequency-wise location of the second region; and tuning the radio equipment to cause the radio equipment to operate in the second region of the radiofrequency spectrum.

In an aspect of some such embodiments, the information additionally directly or indirectly informs the communication device about when the system information will be transmitted by the cellular communication system.

In an aspect of some embodiments, the first and second regions of the radiofrequency spectrum are both located within a region of the radiofrequency spectrum that is allocated for use by the cellular communication system.

DETAILED DESCRIPTION

Figure 1:
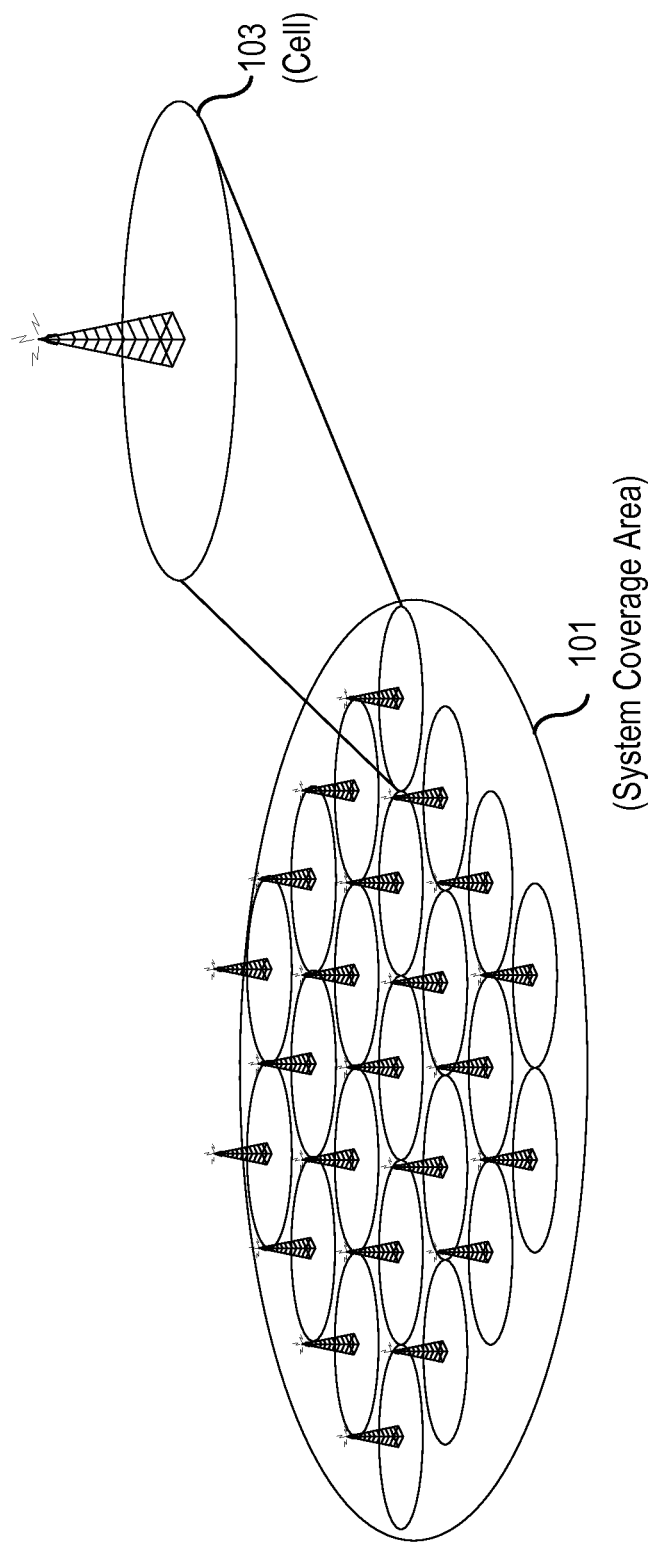
FIG. 1 illustrates a cellular communication system providing a system coverage area by means of a plurality of cells.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits and/or one or more programmed processors). Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

In an aspect of embodiments consistent with the invention, a network node that serves a cell in a cellular communication system supports a conventional standards-compliant communication device (e.g., a first type of communication device capable of receiving a signal having a full bandwidth of the cellular communication system ("first bandwidth")). This cell is herein denoted a "host cell." The network node also supports a second type of communication device (e.g., an MTC device) that is capable of receiving a signal no larger than a second bandwidth, wherein the second bandwidth is smaller than the first bandwidth. Merely for the sake of convenience, reference will be made throughout this document to "MTC device(s)". However, machine type communication is not an essential aspect of the invention. Rather, the various aspects of embodiments consistent with the invention are applicable to any second type of communication device that is capable of receiving a signal no larger than the second bandwidth, even if that second type of communication device involves human interaction. Accordingly, all references to one or more "MTC devices" should be construed generally to include all forms of second type of communication devices, including but not limited to actual machine type communication devices as well as other devices.

For example, taking an LTE system as a non-limiting example (the various aspects of the invention are applicable to other systems as well), the network node can allocate some of its resources, including special MTC-oriented control and data channels, to occupy no more than the second bandwidth (e.g., 6 RBs). In this way, a new set of entities are defined, such as physical channels and system information, targeting communication with MTC devices. The new entities as described herein, in many instances, correspond to entities in legacy LTE systems. Because the invention is not limited for use only by machine type communication, the new entities will be denoted throughout this description by adding the prefix "M-" to the more traditional term. The "M-" can be considered broadly to refer to "MTC", "Modified", "Mini", or any other type of cell or aspect that can be considered to be intended for use by MTC devices (as that term is broadly construed) and which are auxiliary to or, in some circumstances, subordinate to entities of the host cell. Accordingly, the collection of aspects/entities of a host cell that supports MTC devices is herein referred to as an "M-cell", and any reference to "M-cell" may refer to any one, or any combination, or all of those aspects/entities, depending on the context of discussion. Remaining resources (e.g., radiofrequency resources) in the LTE system can be used to support the fully capable, legacy communication devices (i.e., the "first type of communication devices"). Thus, the service areas of the "host cell" and the "M-cell" can be geographically coincident.

Again taking LTE systems as a non-limiting example, in some embodiments, the M-cells may be created by reserving RB pairs that are adjacent in frequency in an ordinary (legacy) subframe, and transmitting an M-PDCCH at an OFDM symbol position that is different from the symbol position occupied by the host cell's PDCCH. As an alternative, particular subframes can be reserved in which M-PDCCHs are transmitted at an OFDM symbol position that would otherwise be occupied by the host cell's PDCCH.

The M-PDCCH may carry the same type of information as the legacy (host cell) PDCCH, including resource block allocation, transport format, and HARQ information necessary to demodulate the downlink data channel, as well as uplink related control information such as scheduling grants and power control commands. However, the M-PDCCH may also contain less or more information, and be encoded differently from the PDCCH.

Mobility can still be based on the central 6 RBs (or comparable small bandwidth in an equivalent communication system) of the host cell in order to avoid repetition of signaling. Moreover, system information, which in some sense can be considered as being conveyed on an M-SI channel, can be transmitted in a coordinated fashion, again avoiding repetition of signaling.

Figure 2:
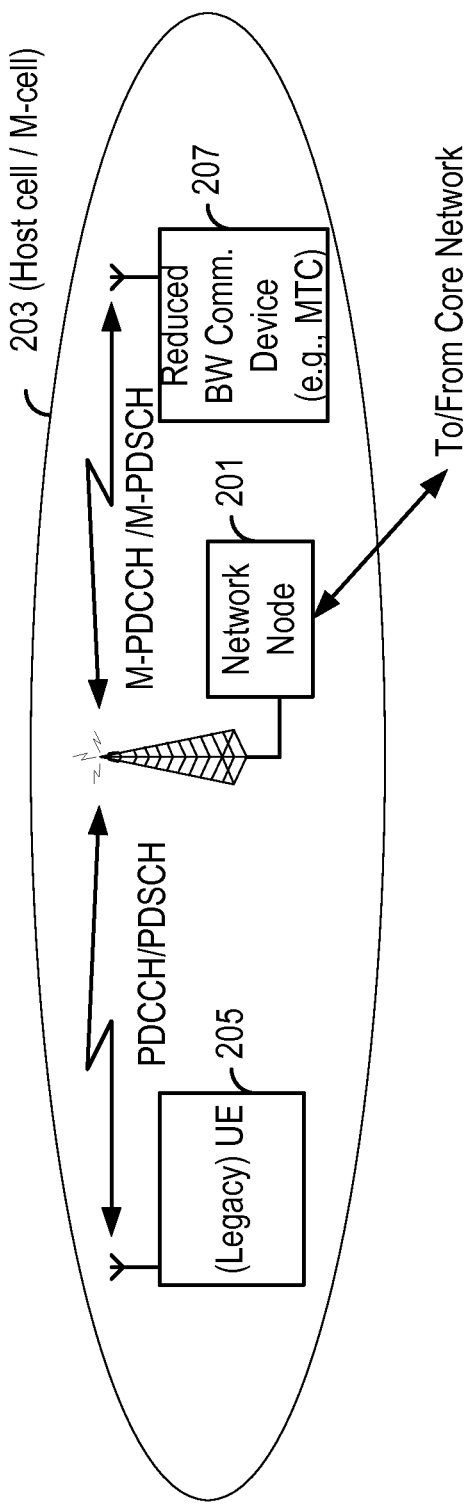
FIG. 2 illustrates a network node 201 that is operated in accordance with some aspects of the invention so as to provide a cell 203 that is both a host cell and an M-cell.

FIG. 2 illustrates a network node 201 that is operated in accordance with some aspects of the invention so as to provide a cell 203 that is both a host cell and an M-cell. To support a standard-compatible (legacy) UE 205, the node 201 allocates some of its radiofrequency resources for use as, for example, a PDCCH and PDSCH as are known according to the communication system standard. In order to allow a reduced bandwidth communication device (e.g., an MTC device) 207 to also connect to and utilize the communication system, the node 201 also allocates other parts of its radiofrequency resources for use as, for example, an M-PDCCH and M-PDSCH. As mentioned earlier, these channels substantially correspond to their legacy system counterparts (although they may differ in some aspects, as also mentioned above) but are sized and timed to permit the reduced bandwidth communication device to connect to and utilize the communication system.

These and other aspects will now be described in greater detail. To facilitate the reader's understanding of the variously described features, the terminology and features associated with an LTE system are used. However, this is done only for the purpose of example, and is not intended to suggest that the various embodiments consistent with the invention are useable only in an LTE system. To the contrary, the various embodiments consistent with the invention are useable in any comparable communication system that presents the same problem as a conventional LTE system (e.g., imposing bandwidth and/or processing power requirements that go beyond what any practical MTC device is capable of satisfying) and provides the ability to allocate resources in a way that is comparable to a conventional LTE system.

Figure 3:
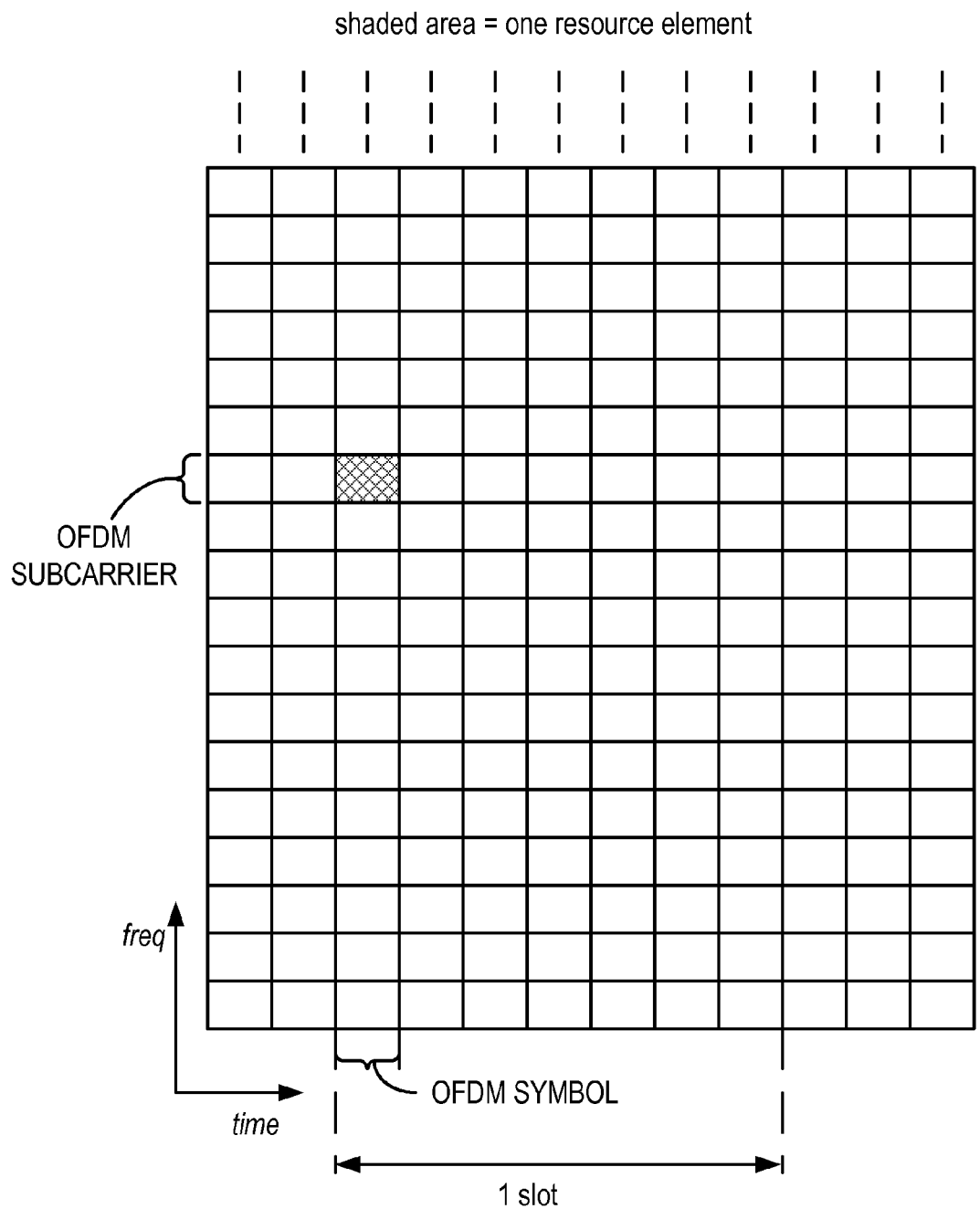
FIG. 3 illustrates a time-frequency grid an exemplary LTE downlink physical resource ("resource element") that corresponds to one OFDM subcarrier during one OFDM symbol interval.

The LTE physical layer downlink transmission is based on OFDM. The basic LTE downlink physical resource can thus be seen as a time-frequency grid as illustrated in FIG. 3, in which each so-called "resource element" corresponds to one OFDM subcarrier during one OFDM symbol interval.

Figure 4:
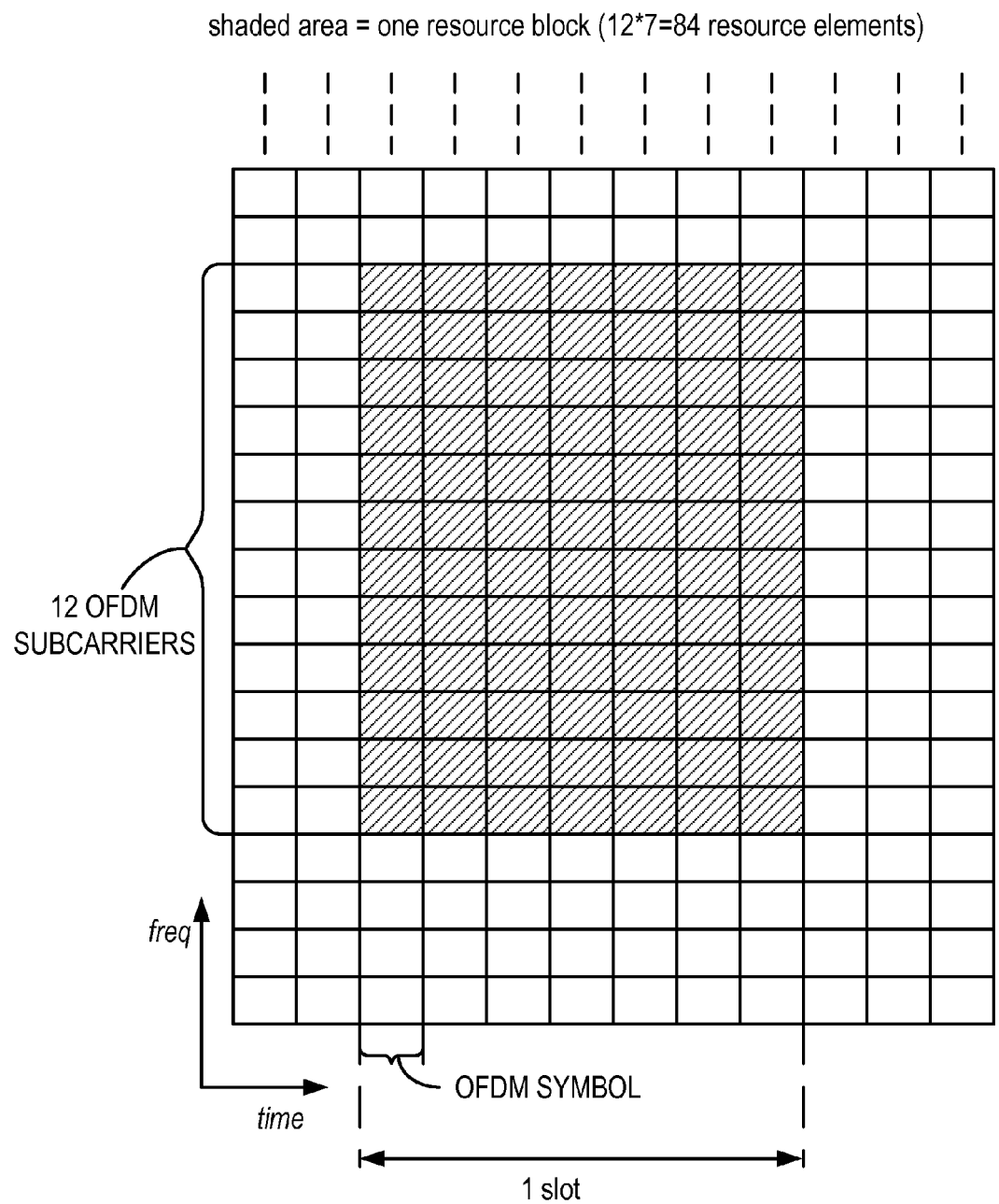
FIG. 4 is a time-frequency grid illustrating how downlink subcarriers in the frequency domain are grouped into resource blocks.

As illustrated in FIG. 4, the downlink subcarriers in the frequency domain are grouped into resource blocks (RBs), where each resource block consists of twelve subcarriers for a duration of one 0.5 ms slot (7 OFDM symbols when normal cyclic prefixes are used (as illustrated) or 6 OFDM symbols when extended cyclic prefixes are used), corresponding to a nominal resource-block bandwidth of 180 kHz.

The total number of downlink subcarriers, including a DC-subcarrier, thus equals $N_c=12 \cdot N_{RB}+1$ where $N_{RB}$ is the maximum number of resource blocks that can be formed from the $12 \cdot N_{RB}$ usable subcarriers. The LTE physical-layer specification actually allows for a downlink carrier to consist of any number of resource blocks, ranging from $N_{RB\text{-}min}=6$ and upwards, corresponding to a nominal transmission bandwidth ranging from 1.4 MHz up to 20 MHz. This allows for a very high degree of LTE bandwidth/spectrum flexibility, at least from a physical-layer-specification point-of-view.

Figure 5A:
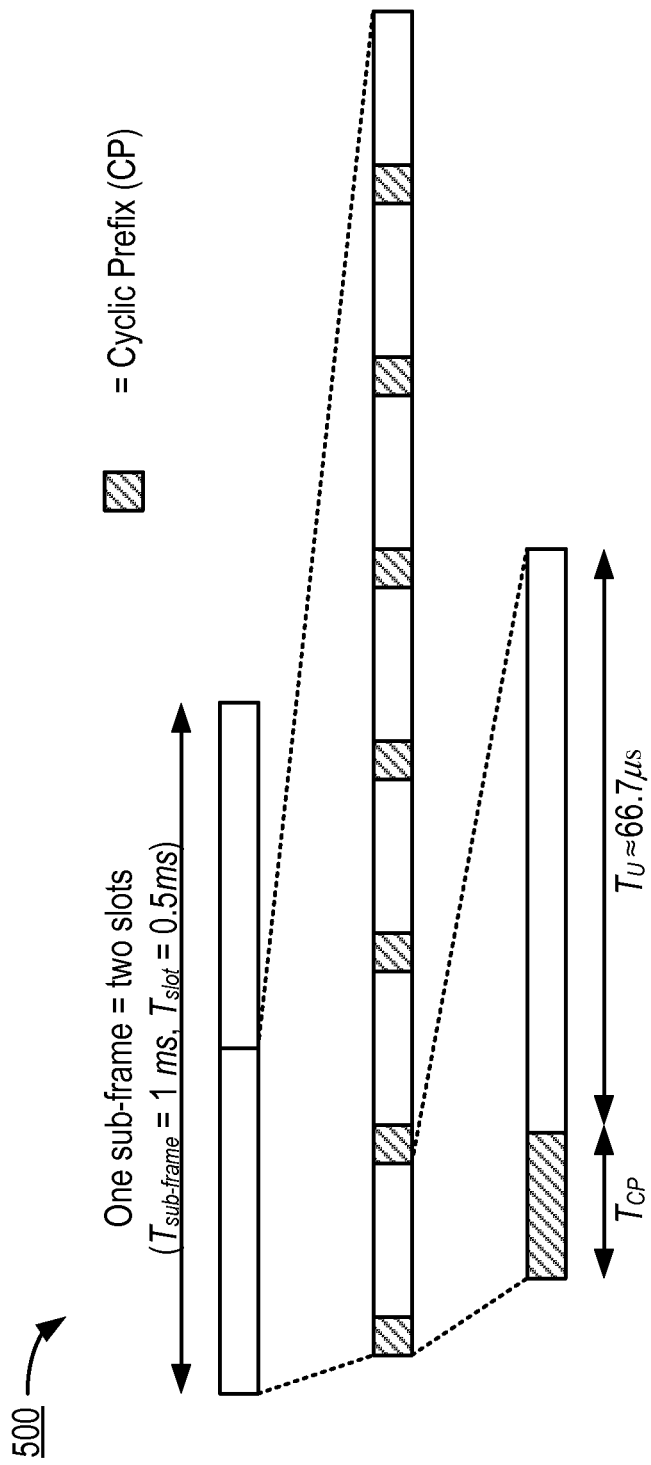
FIG. 5a illustrates a so-called "normal" cyclic prefix length, which allows seven OFDM symbols per slot to be communicated.
Figure 5B:
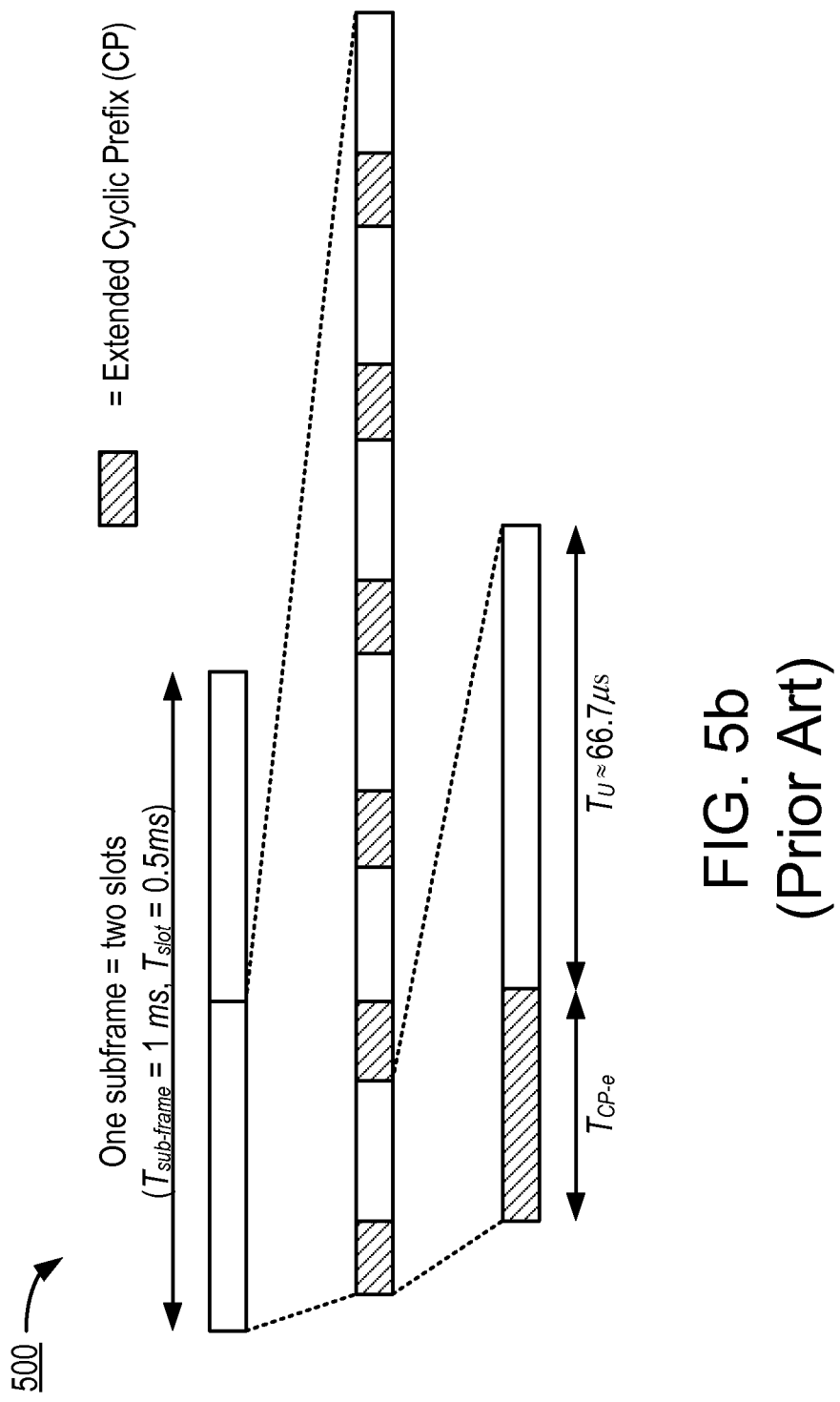
FIG. 5b illustrates an extended cyclic prefix, which because of its longer size, allows only six OFDM symbols per slot to be communicated.

FIGS. 5a and 5b illustrate the time-domain structure for LTE downlink transmission. Each 1 ms subframe 500 consists of two slots of length $T_{slot}=0.5$ ms ($=15360 \cdot T_S$, wherein each slot comprises 15,360 time units, $T_S$). Each slot then consists of a number of OFDM symbols.

A subcarrier spacing $\Delta f=15$ kHz corresponds to a useful symbol time $T_u=1/\Delta f \approx 66.7$ μs ($2048 \cdot T_S$). The overall OFDM symbol time is then the sum of the useful symbol time and the cyclic prefix length $T_{CP}$. Two cyclic prefix lengths are defined. FIG. 5a illustrates a normal cyclic prefix length, which allows seven OFDM symbols per slot to be communicated. The length of a normal cyclic prefix, $T_{CP}$, is $160 \cdot T_S \approx 5.1$ μs for the first OFDM symbol of the slot, and $144 \cdot T_S \approx 4.7$ μs for the remaining OFDM symbols.

FIG. 5b illustrates an extended cyclic prefix, which because of its longer size, allows only six OFDM symbols per slot to be communicated. The length of an extended cyclic prefix, $T_{CP\text{-}e}$, is $512 \cdot T_S \approx 16.7$ μs.

It will be observed that, in the case of the normal cyclic prefix, the cyclic prefix length for the first OFDM symbol of a slot is somewhat larger than those for the remaining OFDM symbols. The reason for this is simply to fill out the entire 0.5 ms slot, as the number of time units per slot, $T_S$, (15360) is not evenly divisible by seven.

When the downlink time-domain structure of a resource block is taken into account (i.e., the use of 12 subcarriers during a 0.5 ms slot), it will be seen that each resource block consists of $12 \cdot 7=84$ resource elements for the case of normal cyclic prefix (illustrated in FIG. 4), and 12·6=72 resource elements for the case of the extended cyclic prefix (not shown).

Another important aspect of a terminal's operation is mobility, which includes cell search, synchronization, and signal power measurement procedures. Cell search is the procedure by which the terminal finds a cell to which it can potentially connect. As part of the cell search procedure, the terminal obtains the identity of the cell and estimates the frame timing of the identified cell. The cell search procedure also provides estimates of parameters essential for reception of system information (SI) on the broadcast channel, containing the remaining parameters required for accessing the system.

To avoid complicated cell planning, the number of physical layer cell identities should be sufficiently large. For example, systems in accordance with the LTE standards support 504 different cell identities. These 504 different cell identities are divided into 168 groups of three identities each.

Figure 6:
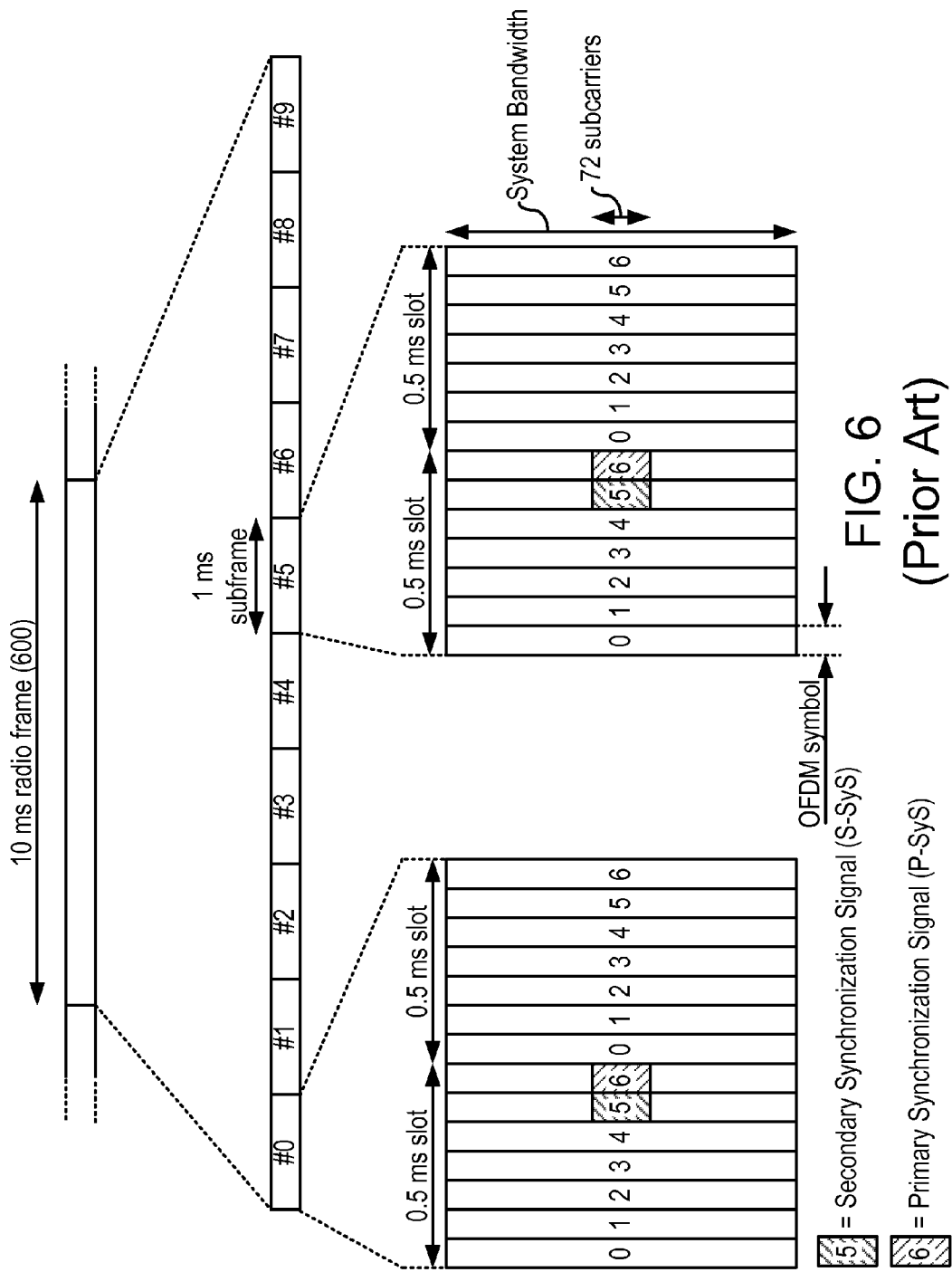
FIG. 6 illustrates the structure of the radio interface of an LTE system.

In order to reduce the cell-search complexity, cell search for LTE is typically done in several steps that make up a process that is similar to the three-step cell-search procedure of the known Wideband Code Division Multiple Access (WCDMA) system. To assist the terminal in this procedure, LTE provides a primary synchronization signal and a secondary synchronization signal on the downlink. This is illustrated in FIG. 6, which shows the structure of the radio interface of an LTE system. The physical layer of an LTE system includes a generic radio frame 600 having a duration of 10 ms. FIG. 6 illustrates one such frame 600 for an LTE Frequency Division Duplex (FDD) system. Each frame has 20 slots (numbered 0 through 19), each slot having a duration of 0.5 ms which normally consists of seven OFDM symbols. A subframe is made up of two adjacent slots, and therefore has a duration of 1 ms, normally consisting of 14 OFDM symbols. The primary and secondary synchronization signals are specific sequences, inserted into the last two OFDM symbols in the first slot of each of subframes 0 and 5. The primary synchronization signal can occupy less bandwidth than does the secondary synchronization signal. In addition to the synchronization signals, part of the operation of the cell search procedure also exploits reference signals that are transmitted at known locations in the transmitted signal.

Figure 7:
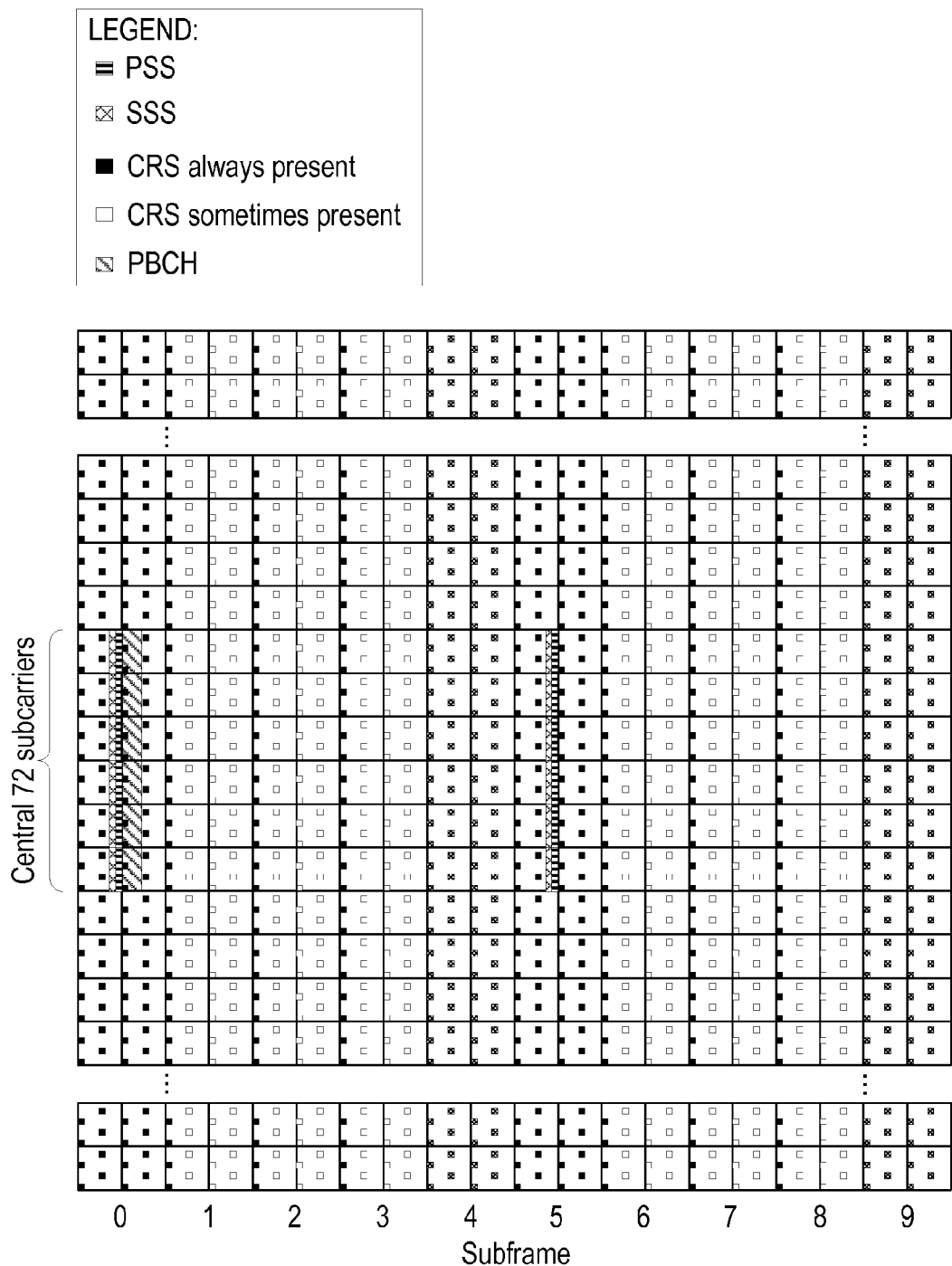
FIG. 7 is a depiction of the structure of the radio interface (time-frequency grid) of a legacy LTE system.

FIG. 7 is another depiction of the structure of the radio interface (time-frequency grid) of a legacy LTE FDD cell. It can be seen that the radiofrequency spectrum allocated to the legacy LTE FDD cell is wider than the smallest downlink system bandwidth of 1.4 MHz (72 subcarriers or 6 RBs). Subframes 1-3 and 6-8 may be used for MBSFN or may be signaled to be used for other purposes, in which case a UE cannot expect reference signals in more than the first OFDM symbol interval. (To avoid cluttering the figure, it does not show each of the OFDM symbol intervals within each subframe.) The Physical Broadcast Channel (PBCH) (carrying the MIB) and synchronization signals are transmitted at prior known OFDM symbol positions over the central 72 subcarriers.

Operating a node (e.g., the node 201) to concurrently support a host cell and an M-cell includes a number of aspects, some of which are alternatives to others, and with some alternatives being usable together. This will become clearer as the various embodiments consistent with the invention are described.

Figure 8:
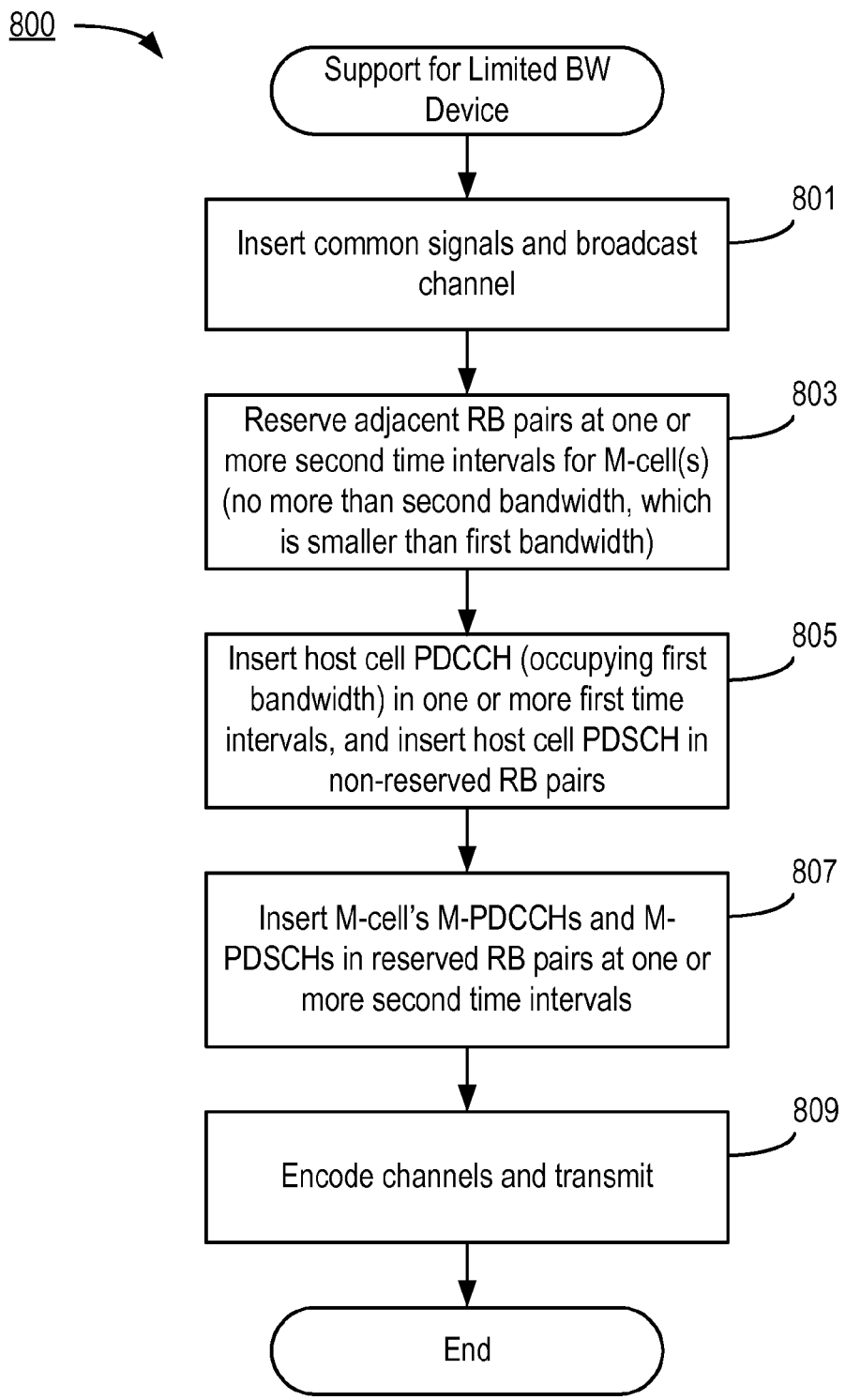
FIG. 8 is, in one respect, a flow chart of steps/processes performed by a communication system node in accordance with exemplary embodiments of the invention.

FIG. 8 is, in one respect, a flow chart of steps/processes performed by a communication system node in accordance with some but not necessarily all exemplary embodiments of the invention. In another respect, FIG. 8 can be considered to depict exemplary means 800 comprising the various illustrated circuitry (e.g., hard-wired and/or suitably programmed processor) configured to perform the described functions.

To support an MTC device, the node prepares data to be transmitted by inserting common signals and broadcast channel (on which the MIB is transmitted) into a buffer that corresponds to the time/frequency grid of resource elements to be transmitted (step 801). In particular time intervals (herein also denoted "second time intervals") of particular subframes, the node creates one or more M-cells by reserving one or more blocks of RB pairs that are adjacent in frequency, and which in total occupy a bandwidth (herein also denoted "second bandwidth") that is no greater than that which an MTC device can handle (step 803). A conventional (legacy) PDCCH spanning across the entire host cell system bandwidth (herein also denoted "first bandwidth") is inserted into 1, 2 or 3 of the first OFDM symbol intervals (herein denoted "one or more first time intervals") (step 805). An M-PDCCH, which may correspond to a time-shifted legacy PDCCH spanning the bandwidth of the reserved RBs, but is not restricted to using all of them, is inserted into some number of the reserved resource elements, as are also the M-PDSCHs (step 807). The reserved resource elements can be in any symbol other than one in which any legacy physical channel is placed. The OFDM symbol times into which the M-PDCCH is/are inserted may be made prior known to the MTC device (e.g., by signaling to the MTC device or alternatively inherently made known via standardization), or alternatively the MTC device may use blind detection techniques to detect the M-PDCCH.

The M-PDCCH may point out an M-PDSCH allocation time-wise following immediately after the M-PDCCH within the same subframe. Alternatively, the control signaling may also be staggered such that the actual allocation pointed out by the M-PDCCH follows in a later subframe carrying M-cell(s). The exact location in time of this later subframe may be signaled to the MTC device by the M-PDCCH, known a priori by the MTC device, or detected blindly by the MTC device. The frequencies allocated to the M-PDSCH can be within the same bandwidth occupied by the M-PDCCH, but in alternative embodiments can occupy a different MTC-capable frequency bandwidth.

Once all information has been inserted, the channels are encoded and transmitted (step 809).

Figure 9:
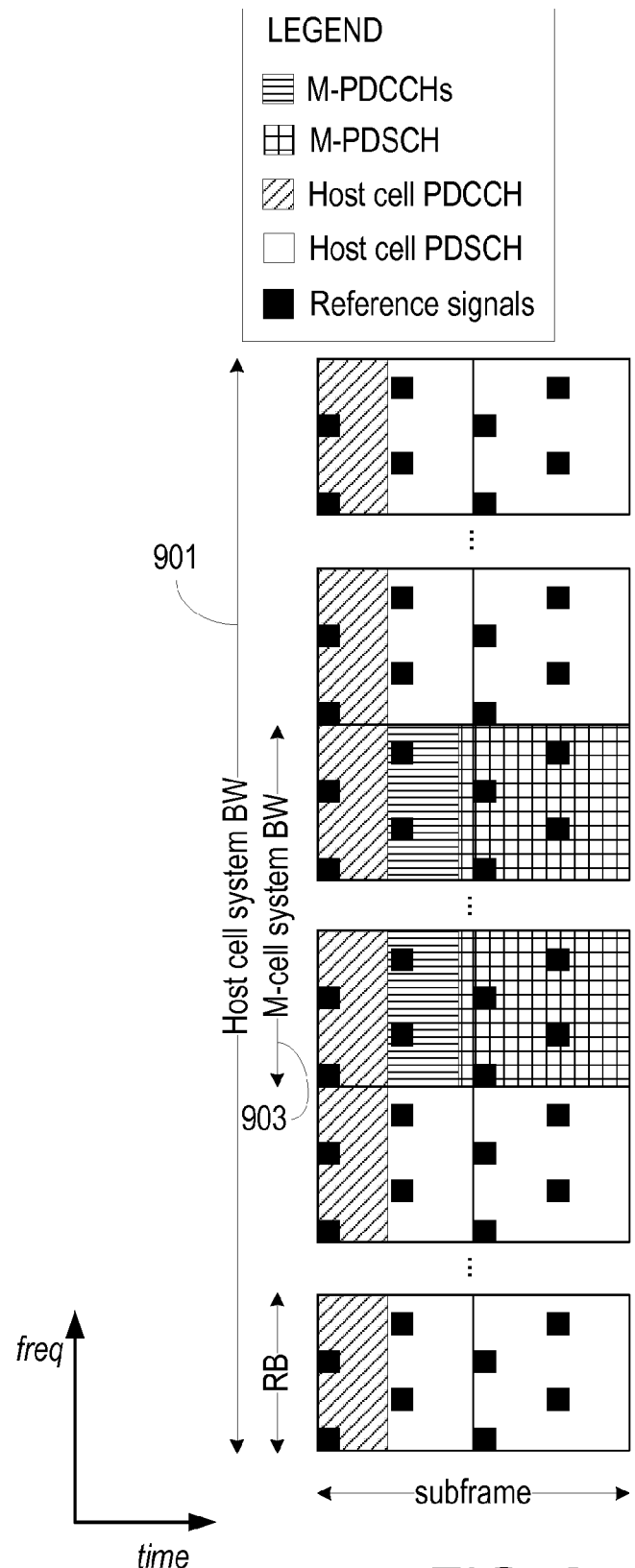
FIG. 9 is a time-frequency grid of an exemplary subframe in which a node has created a host cell and an M-cell in a manner such as is described with reference to FIG. 8.

FIG. 9 is a time-frequency grid of an exemplary subframe in which a node has created a host cell and an M-cell in a manner such as is described with reference to FIG. 8. In this non-limiting example, the host cell's control channel (PDCCH) extends over a first bandwidth 901 of a radiofrequency spectrum. The M-cell's control channel (M-PDCCH) occupies a second bandwidth 903 of the radiofrequency spectrum, wherein the second bandwidth is smaller than the first bandwidth. As further illustrated in this non-limiting example, the second bandwidth of the radiofrequency spectrum is frequency-wise located within a frequency-wise location of the first bandwidth of the radiofrequency resource. As can be seen, pairs of RBs have been reserved for use by the M-cell. The first OFDM symbols carry a legacy (host cell) PDCCH (indicated by diagonal stripes), which spans across the full downlink system bandwidth 901. In the reserved RB pairs, some of the following OFDM symbols carry the M-PDCCH (indicated by horizontal stripes), which spans less than the full system bandwidth (e.g., 6 RBs) so that it is receivable by an MTC device.

The remaining resource elements in the reserved RBs may carry the M-PDSCH (illustrated by a grid-like fill). Remaining resource elements outside of the PDCCH and the reserved RBs may carry the host cell PDSCH (illustrated by white space), except that reference signals (illustrated by black squares) populate their system-specified positions across the full downlink system bandwidth, so that they are available for use by both a legacy UE and an MTC device.

Figure 10:
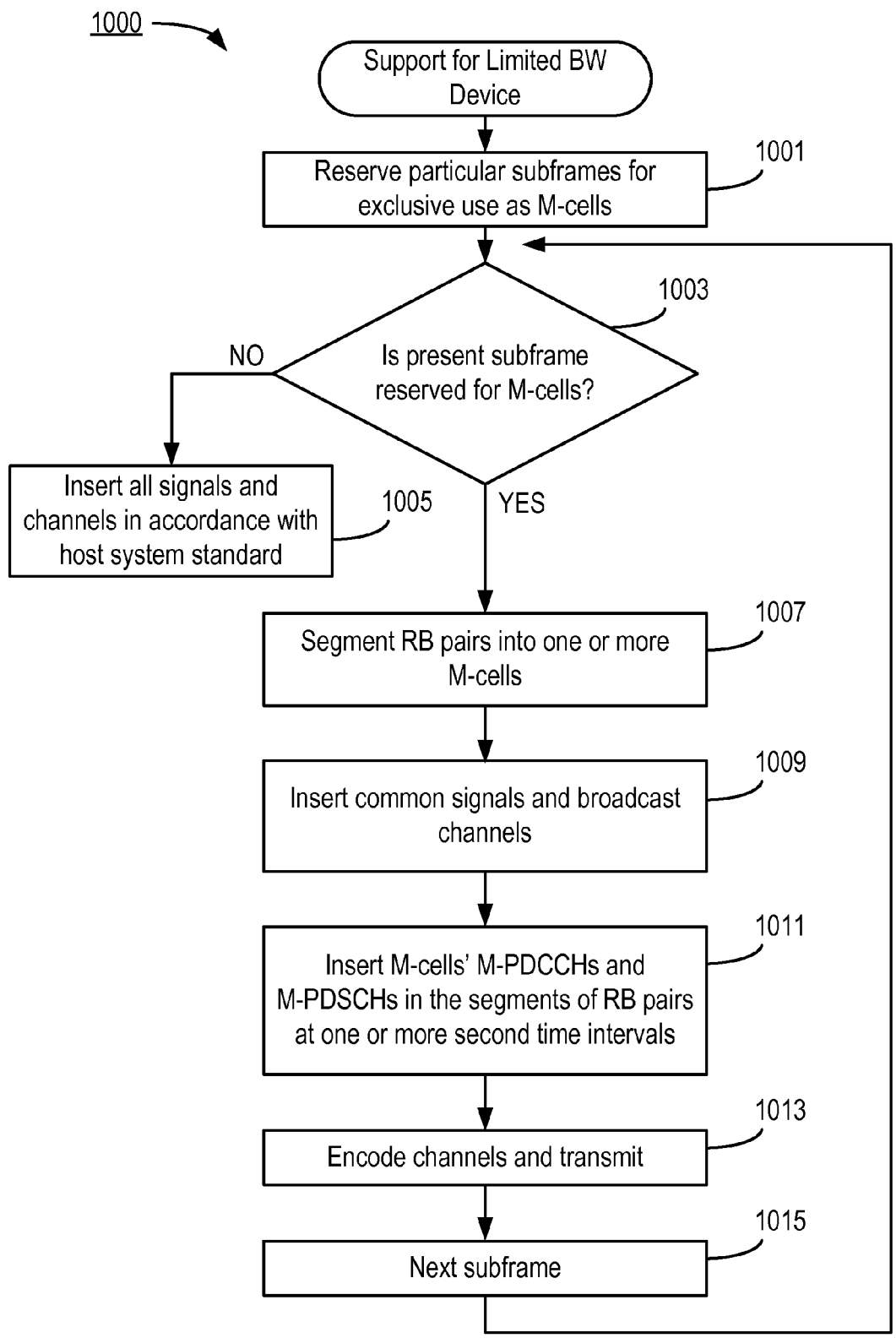
FIG. 10 is, in one respect, a flow chart of steps/processes performed by a communication system node in accordance with some but not necessarily all exemplary embodiments of the invention.

The focus of discussion will now be turned to an alternative way of operating a node (e.g., the node 201) to concurrently support a host cell and an M-cell. Various aspects of this alternative are depicted in FIG. 10, which is, in one respect, a flow chart of steps/processes performed by a communication system node in accordance with some but not necessarily all exemplary embodiments of the invention. In another respect, FIG. 10 can be considered to depict exemplary means 1000 comprising the various illustrated circuitry (e.g., hard-wired, or suitably programmed processor circuitry) configured to perform the described functions.

In these embodiments, the node reserves particular subframes for exclusive use as M-cells (step 1001). This means that there will be no host cell information conveyed in the reserved subframes. In operation, the node tests whether a present subframe is one of the reserved subframes (decision block 1003). If not ("NO" path out of decision block 1003), the node inserts and then transmits all signals and channels in accordance with the host system standard (step 1005).

In each of the reserved subframes, efficient use of the node's radiofrequency resources can be made by stacking different M-cells on top of each other frequency-wise, although this is not a requirement in any particular embodiment. Thus, if the present subframe is one of the reserved subframes ("YES" path out of decision block 1003), the node segments RB pairs into one or more M-cells (step 1007). The node then inserts common signals and broadcast channels (step 1009). Common channels are the same or a subset of channels used for the host cell (e.g., reference signals).

Each M-cell has an M-PDCCH which may span the M-cell's system bandwidth (which is smaller than the host cell's system bandwidth). This M-PDCCH may correspond to a legacy PDCCH for bandwidth spanned by the M-cell, but is not restricted to do so. Thus, in some embodiments, the M-PDCCH can act just like a legacy PDCCH would, had it been part of a legacy cell with the smaller bandwidth. In this way, the M-cell can be made to function exactly like a legacy cell during the reserved subframes. In alternative embodiments, deviations from legacy PDCCH compliance can be made. For example, the M-PDCCH may not cover the entire bandwidth reserved for the M-cell. In another example, the M-PDCCH may be encoded differently from legacy PDCCH encoding (e.g., the M-PDCCH may include formats that are not permitted in a legacy PDCCH).

Similarly to the embodiments described above with reference to FIGS. 8 and 9, the M-PDCCH may point out an M-PDSCH allocation time-wise and/or frequency-wise following immediately after the M-PDCCH in the same subframe. Alternatively, the control signaling may be staggered such that the actual allocation pointed out by the M-PDCCH follows in a later subframe carrying M-cell(s). Moreover the M-PDCCH may carry additional information, such as but not limited to grant(s) and power control commands (TPC) for transmissions to be performed by an MTC device on the uplink (UL).

Accordingly, the node inserts the M-PDCCH(s) and M-PDSCH(s) of the M-cell(s) in the segments of RB pairs at the planned OFDM symbol intervals (second time intervals) within the present subframe (step 1011). Once all of the information has been arranged, it the channels are encoded and transmitted (step 1013). The node then selects the next subframe to be transmitted (step 1015) and repeats the process for the newly selected "present" subframe by returning to decision block 1003.

Figure 11:
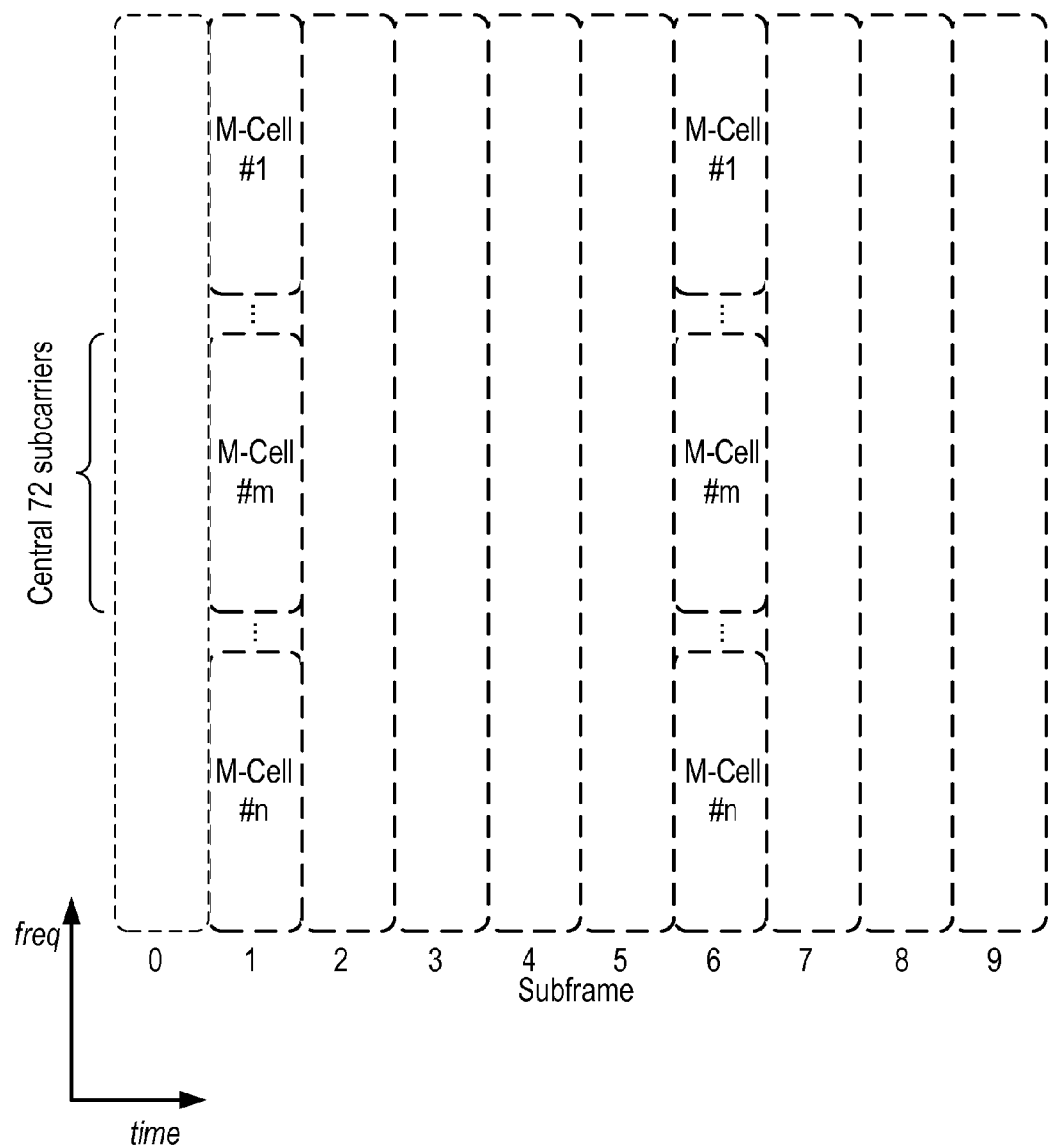
FIG. 11 is a time-frequency grid that illustrates how a plurality of M-cells can be stacked within reserved subframes.

FIG. 11 is a time-frequency grid that illustrates how a plurality of M-cells can be stacked within reserved subframes as described above. In FIG. 11, subframes 1 and 6 are reserved for exclusive use as M-cells, and each of these subframes is partitioned into some number, n, of M-cells, where n is an integer that is greater than or equal to 1. The remaining subframes 0, 2-5, and 7-9, are useable as host cells.

Figure 12:
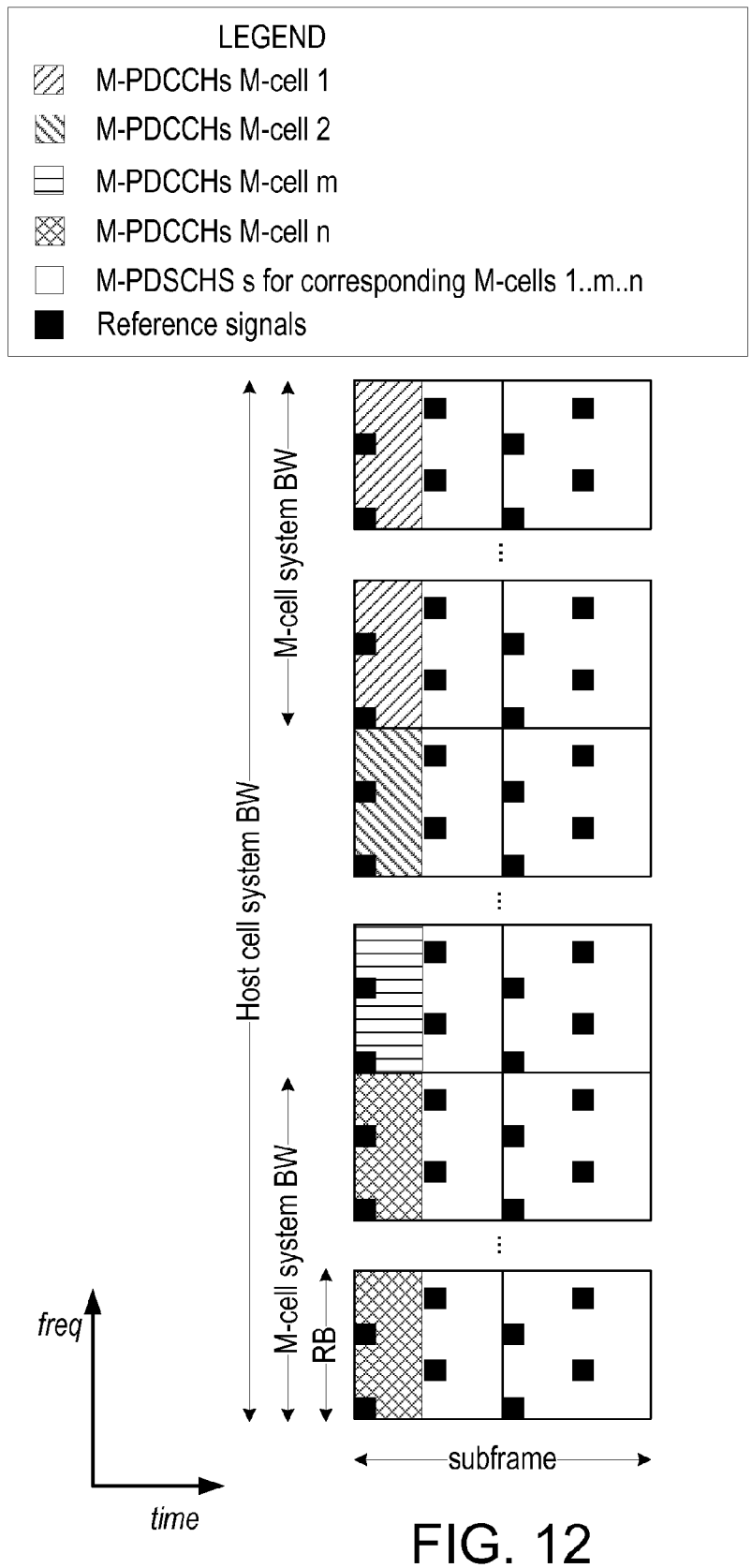
FIG. 12 is a time-frequency grid of an exemplary subframe that has been reserved by a node for exclusive use by one or more M-cells.

FIG. 12 is a time-frequency grid of an exemplary subframe that has been reserved by a node for exclusive use by one or more M-cells, 1 . . . m . . . n, where 1≤m≤n. These subframes have been created in a manner as described with respect to FIGS. 10 and 11. No legacy PDCCH needs to be transmitted in this subframe. Therefore, the M-PDCCHs transmitted in each M-cell can start at the first OFDM symbol interval. Remaining resource elements in each M-cell are used for M-PDSCHs, except that reference signals (illustrated by black squares) can still populate their system-specified positions across the full downlink system bandwidth.

The reserved subframes may be pointed out as restricted subframes or MBSFN subframes in the host cell system information in order to prevent legacy UEs from trying to decode a PDCCH in the reserved subframes (which decoding operation will inevitably fail). However, this is not a requirement in all embodiments.

In another aspect, the M-PDCCH of the M-cell may be added or punctured into the symbols carrying PDCCH in the host cell. Special care may then be taken to not let the M-cell overlap crucial and static information on the host cell PDCCH, such as the Physical Control Format Indicator Channel (PCFICH).

In still other embodiments, a node may arrange for some subframes to support both a host cell and one or more M-cells, in a manner such as that described above with respect to FIGS. 8-9, and may also reserve other subframes for the exclusive use of M-cells in a manner such as that described above with respect to FIGS. 10-12.

The description will now focus on ways for the node to supply MTC-related system information (M-SI) to MTC devices. The node may transmit an M-SI block (M-SIB) that contains information such as, and without limitation:

Random access parameters (i.e., information indicating what random access sequence and what time-frequency positions to use); and/or Subframe pattern of the M-cells (or information that allows this to be deduced); and/or Subframe pattern of the host cell (subframes containing CRS) (or information that allows this to be deduced).

The M-SI may be transmitted either in prior determined time-frequency positions according to an MTC standard, at a position pointed out by other signaling (e.g., by a MIB transmitted by the host cell and that, because of its limited bandwidth, is also receivable by an MTC device), or at a position that is revealed by an M-PDCCH that is to be blindly detected the first time the MTC device accesses the host cell. The M-SI is transmitted over a limited bandwidth (e.g. 6 RBs). The M-SI may be transmitted in an M-cell that is centered around the carrier frequency of the host cell, but is not restricted to be so. If transmitted around the host cell carrier frequency over a bandwidth of 6 RBs, the MTC device can carry out cell search, MIB acquisition and SI acquisition over a bandwidth of 6 RBs and without re-tuning the radio.

Other aspects of embodiments consistent with the invention relate to enabling an MTC device to make use of a suitable random access channel in order to establish a connection with an M-cell. Several alternatives are possible. In one of these, the first time the MTC device connects to an M-cell associated with the host cell, it may do so by carrying out random access towards an MTC "attractor" cell that is centered around the host cell carrier frequency and which is known to all MTC devices by means of, for instance, standardization. The attractor M-cell may be the same cell as the one transmitting M-SI. The random access time/frequency resources may be the same as the ones used in the host cell.

The attractor M-cell may be able to support one or more of the MTC devices that make a random access request, but in general will not be able to support all requestors. Therefore, in response to the random access procedure, the node sends the requesting MTC device a message that directs the MTC device to one of the other M-cells in the event that it is not suitable for the MTC device to be connected to this M-cell. The MTC device thereafter remembers the target M-cell to which it has been directed through state transitions between Radio Resource Control "Idle" (RRC_IDLE) and Radio Resource Control "Connected" (RRC_CONNECTED) until signaled otherwise.

As an alternative to the use of an attractor M-cell, in some embodiments the MTC device determines the target M-cell itself based on a standardized formula which may take, for example and without limitation, the MTC device's IMSI (international mobile subscriber identity), the host cell bandwidth, and information from the M-SI into account. In this approach, the MTC device reads the MIB and M-SI and thereafter carries out random access directly towards the target M-cell. Even here, however, a mechanism to redirect the MTC device to yet another M-cell may still be supported in order to allow further load-balancing by the node.

Figure 13:
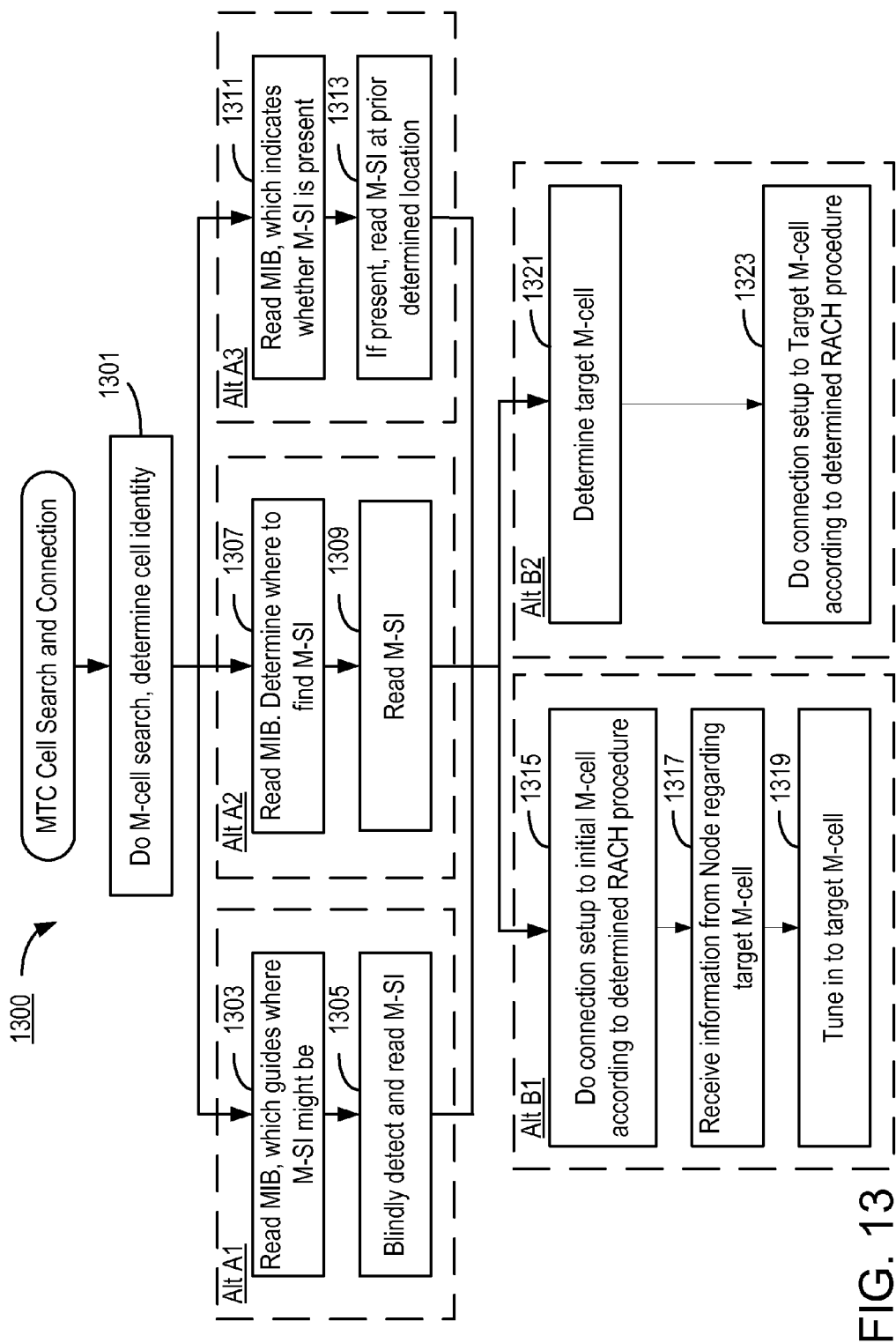
FIG. 13 is, in one respect, a flow chart of steps/processes relating to M-cell search and connection, performed by an MTC device in accordance with some but not necessarily all exemplary embodiments of the invention.

To further illustrate aspects of the invention related to the M-SI and random access procedures for M-cells, FIG. 13 is presented which is, in one respect, a flow chart of steps/processes relating to M-cell search and connection, performed by an MTC device in accordance with some but not necessarily all exemplary embodiments of the invention. In another respect, FIG. 13 can be considered to depict exemplary means 1300 in an MTC device for performing M-cell search and connection, the means comprising the various illustrated circuitry (e.g., hard-wired, and/or suitably programmed processor circuitry) configured to perform the described functions.

Initially, the MTC device performs an M-cell search, and determines a cell identity and timing (step 1301). It is noted that the host cell supports its own cell search by means of its primary and secondary synchronization signals (see, e.g., FIGS. 6 and 7) which each occupy only 1.4 MHz (6 RBs) of its radiofrequency resources. Therefore, the MTC device can use these same signals for purposes of performing its own M-cell search.

The MTC device then acquires its system information (M-SI) according to any one of three exemplary alternatives, herein denoted "Alt A1", "Alt A2", and "Alt A3". Looking first at Alt A1, the MTC device reads the MIB that is transmitted by the host cell (step 1303). This is possible because, even in the host cell, the MIB occupies no more than 1.4 MHz (6 RBs). In this embodiment, the MIB includes information that identifies one or more possible upcoming locations (i.e., in terms of time/frequency) in which the M-SI might be located if it is being transmitted. Based on this information, the MTC device uses a blind detection technique to detect and acquire information from the M-SI (step 1305).

Looking now to the embodiment denoted Alt A2, the MTC device reads the MIB that is transmitted by the host cell (step 1307). In this embodiment, the MIB includes information from which the exact time/frequency location of an upcoming M-SI can be determined either directly or indirectly. That is, the MIB either directly includes the time/frequency location of an upcoming M-SI, or alternatively provides it by means of one or more level of indirectness. Using one level of indirectness as a non-limiting example, the MIB would include the time/frequency location of upcoming information that is readable by the MTC device and which includes the exact time/frequency location of an upcoming M-SI. Based on this information, the MTC device detects and acquires information from the M-SI (step 1309)

Turning now to the embodiment denoted Alt A3, the MTC device reads the MIB that is transmitted by the host cell (step 1311). In this alternative, the MTC device has previously been supplied with information indicating the time/frequency location of where an upcoming M-SI would be (e.g., via standardization), but it does not know whether the M-SI is being transmitted in any particular subframe. Therefore, the MIB provides this information (e.g., by means of a flag that indicates either "M-SI present" or "M-SI not present"), so that the MTC device knows whether to attempt to read the M-SI or not. Assuming that the MIB indicates that an M-SI will be present in its upcoming known location, the MTC device reads the M-SI at that location (step 1313).

Having completed any of the alternatives Alt A1, Alt A2, or Alt A3 or any other equivalent alternative, the MTC device has read the MIB and the M-SI. The MTC device is therefore now ready to perform connection setup to the M-cell. In other aspects of embodiments consistent with the invention, performing connection setup can be accomplished in any of a number of alternative ways, two of which are shown in FIG. 13. These are denoted Alt B1 and Alt B2, respectively.

Looking first at Alt B1, the situation here is one in which the MTC device does not know the time/frequency location of the target M-cell to which it will ultimately be directed, but it does know (e.g., via standardization such as by use of an "attractor" cell as described earlier, or by means of information obtained directly or indirectly from MIB information) the location of an initial M-cell to carry out the RACH procedure with. Therefore, the MTC device performs connection setup (e.g., using RACH parameters obtained from the M-SI) to this "initial" M-cell (step 1315). In response to this access to the initial M-cell, the MTC device receives information that indicates the time/frequency location of the target M-cell (step 1317). It is possible that the target M-cell could be the same cell as the initial M-cell, or it could be a different M-cell.

Having learned the time/frequency location of the target M-cell, the MTC device tunes in and connects to the target M-cell (step 1319). The MTC device may now utilize the communication system to satisfy its communication needs.

Considering now Alt B2, the premise of this scenario is that the MTC device is itself capable of determining the time/frequency location of its target cell. For example, it may be the case that an attractor cell, as described earlier, is the target cell for the MTC device. In other alternatives, the MTC device may (as described earlier) produce a time/ frequency location based on information already known to the MTC device. Such information may include, without limitation, any or all of the MTC device's IMSI, host cell bandwidth, and information from the M-SI. Therefore, the MTC device starts out by itself determining the time/frequency location of the target M-cell (step 1321) and then performing connection setup to the target M-cell according to the RACH procedure that it has already determined (e.g., using RACH parameters obtained from the M-SI) (step 1323).

In other aspects of embodiments consistent with the invention, the fact that an MTC device is able to re-tune the frequency about which its operational bandwidth is centered is used to advantage. In one aspect, some embodiments transmit the M-SI in only one of a plurality of M-cells. The particular one of the M-cells in which the M-SI is transmitted can be static over time, or it may vary over time (but still appear in only one of the M-cells at a time). Each of these embodiments results in an efficient use of the host cell's radiofrequency resources.

Figure 14:
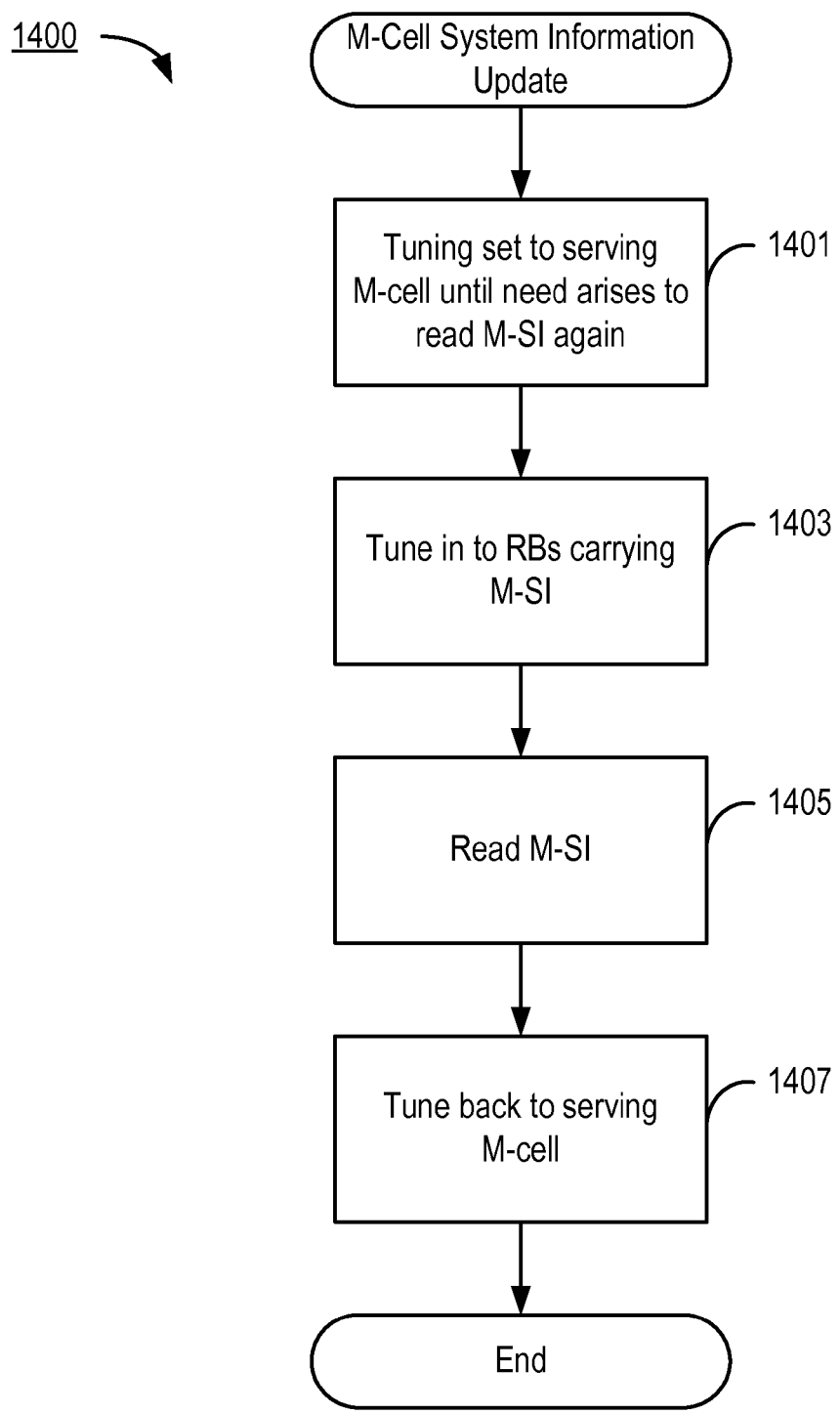
FIG. 14 is, in one respect, a flow chart of steps/processes performed by an MTC device in accordance with some but not necessarily all exemplary embodiments of the invention.

To illustrate features of the above-described aspects, FIG. 14 is, in one respect, a flow chart of steps/processes performed by an MTC device in accordance with some but not necessarily all exemplary embodiments of the invention. In another respect, FIG. 14 can be considered to depict exemplary means 1400 comprising the various illustrated circuitry (e.g., hard-wired and/or suitably programmed processor) configured to perform the described functions.

The MTC device connects to a target M-cell in any of the ways as described earlier. The target M-cell then operates as the MTC device's serving M-cell. The MTC device accordingly operates in the communication system with its radio equipment tuned to that part of the host cell's radiofrequency spectrum that is allocated to the serving M-cell (step 1401).

This continues until the need arises to read the M-SI again (e.g., when system information expires or the MTC device is notified that system information has changed). When this happens, the MTC device tunes its radio equipment to be able to operate in a different radiofrequency region, namely the frequency region that includes the resource blocks carrying the M-SI (step 1403). Some or all of the frequency regions used by the MTC device may be located within the operating bandwidth of the host cell, but in alternative embodiments may, under control of the host cell, be located in other radiofrequency bands. It will be appreciated that tuning to a different radiofrequency band is quite different, from a technical point of view, from standard radio equipment tuning to a different frequency or set of frequencies all lying within a same frequency band. For example, the requirements on filters are quite different.

Having changed the frequency region within which it is operating to match that of the M-SI, the MTC device reads the M-SI 1405, and then tunes its frequency region back to that which is occupied by the serving M-cell (step 1407) so that it can continue its operation.

It will be appreciated that while some MTC devices are hopping between frequency regions to both communicate with their serving M-cell and to receive updated M-SI, for some other MTC devices having the same host system, the serving M-cell and the M-cell that is transmitting the M-SI can be one and the same M-cell.

In still another aspect of embodiments consistent with the invention, frequency diversity can be improved by having the actual resource blocks allocated to an M-cell vary in time using a predefined frequency hopping sequence. The actual frequency hopping pattern can, in some but not necessarily all embodiments, be different in the downlink and uplink directions.

The discussion will now focus on reference signals. As mentioned earlier, the MTC devices can utilize reference signals (e.g., CRSs) that populate their system-specified positions across the full downlink system bandwidth of the host system. Such references signals are illustrated, for example, as the black squares depicted in FIGS. 9 and 12. This approach allows an MTC device to use additional subframes for channel estimation, radio resource management (RRM), and radio link monitoring (RLM) measurements. In order to utilize these reference signals, the MTC device takes frequency offsets between its own M-cell and the host cell into account. The frequency offset is the offset between the central subcarrier of the host cell and that of the M-cell. Moreover, in the case of LTE and similar systems, the center frequency of the available frequency bandwidth (first bandwidth) is, by standardization, left unused. This would not be the case for the M-cell's frequency region (having the second bandwidth smaller than the first bandwidth) unless the M-cell's frequency region happens to be centered around the center frequency of the host cell.

However, in some but not necessarily all embodiments, the M-cells may use their own reference signals (i.e., reference signals that differ from the ones transmitted by the host cell). In some of these embodiments, the MTC device may still gain a benefit with respect to resource mapping and/or decoding by considering the resources occupied by the host cell reference signals, based on the host cell configuration. The MTC device can deduce which subframes it can use in addition to the M-cell subframes by analyzing the M-SI described earlier.

Still other aspects relate to reception and transmission, and more particularly to the use of HARQ in connection with MTC devices. The roundtrip time for HARQ is typically set by standardization with respect to devices that have connected to the host cell. But, as explained earlier, MTC devices often lack the processing power required to satisfy the quick turnaround between receipt of data and the time at which an acknowledgement (ACK) or negative acknowledgement (NACK) needs to be transmitted back to the data originator. Since all reception of unicast traffic and all transmissions after the initial random access are carried out in the serving M-cell, in another aspect of some embodiments consistent with the invention, the roundtrip time for HARQ is adapted to take the M-cell subframe pattern into account. Thus, the MTC device may have more time after receipt of data before it is required to return an ACK/NACK.

Moreover, if M-PDCCH staggering (as described earlier) is supported, the roundtrip time is further modified to take this into account as well.

Still other aspects of some embodiments consistent with the invention include the node revealing M-cell capabilities via the MIB, or via some other signal that can be embedded at a prior known time/frequency position. The latter may include the MTC device blindly trying to decode an M-PDCCH for M-SI using a prior known M-SI radio network temporary identifier (M-SI-RNTI).

Figure 15:
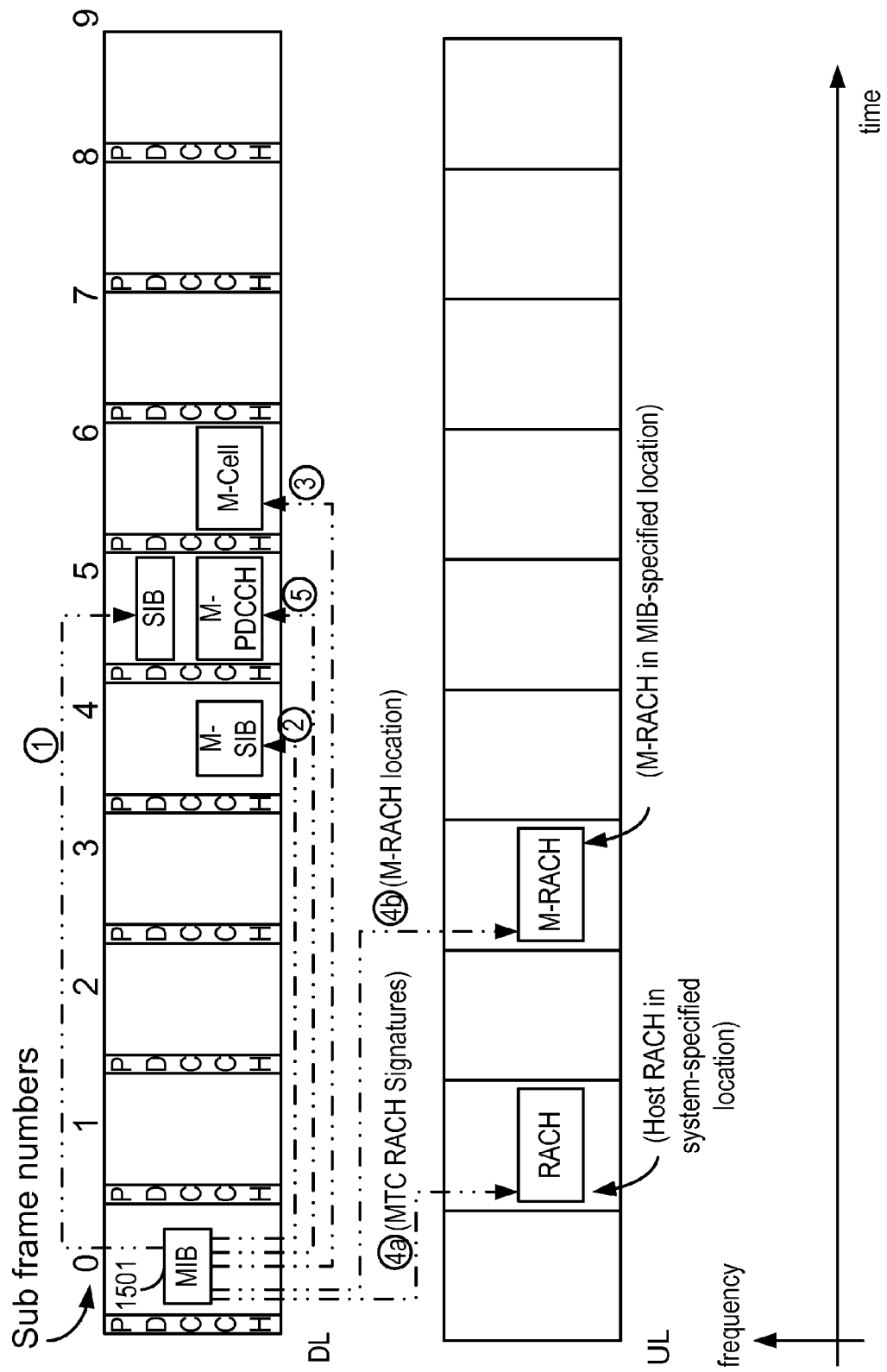
FIG. 15 is a timing/frequency diagram of a MIB and its relationship to various other MTC elements within the host cell spectral resources.

It was mentioned earlier that, in some embodiments, the MIB can supply an MTC device with information that is useful for enabling the MTC device to locate an M-cell and/or to locate an M-PDCCH and/or to locate an M-SI, and/or to know how it can perform an M-RACH procedure. These aspects will now be described in further detail with reference to FIG. 15, which is a timing/frequency diagram of a MIB 1501 and its relationship to various other MTC elements within the host cell spectral resources.

In one aspect, the MIB 1501 (which occupies its standard location in the host cell) includes time/frequency information (represented by the number "1" enclosed in a circle) that informs the MTC device of a location of the resource blocks and/or modulation and coding scheme (MCS) allocated to the first system information block (SIB 1) that is transmitted in a system standardized location (e.g., in subframe 5 in an LTE system). The first SIB, which is a legacy SIB, is allocated frequency resources such that it can be read by an MTC device. It includes such information as the RACH time/frequency grid and RACH signatures.

In another aspect, the MIB 1501 includes time/frequency information (represented by the number "2" enclosed in a circle) that informs the MTC device of a location of the resource blocks (or subset resource elements within certain resource blocks) and/or MCS allocated to a specific M-SIB that is transmitted in a certain subframe.

In still another aspect, the MIB 1501 includes time/frequency information (represented by the number "3" enclosed in a circle) that informs the MTC device of a location of the resource blocks and/or MCS allocated to a specific M-cell. Armed with this information, the MTC device is then able to determine (e.g., via standardization) positions of an M-MIB and/or M-SIB(s) associated with the M-cell.

In still another aspect, the MIB 1501 includes a set of MTC-specific RACH sequences and/or RACH regions in the time/frequency grid to be used by the MTC device for connection setup. In a first variant (represented by the reference characters "4a" enclosed in a circle), the MTC device will be using the host system's standard RACH, which is located in a standardized time/frequency location. Therefore, the MIB 1501 does not necessarily need to provide location information to the MTC device, but it does at least include the MTC-specific RACH sequence that should be used when performing connection setup via the RACH. In a second variant (represented by the reference characters "4b" enclosed in a circle), the MTC device will be using an MTC-specific RACH. Therefore, the MIB includes at least the RACH region in the time/frequency grid to be used by the MTC device for connection setup. As explained earlier, the MTC device may be able to derive the RACH sequence to use during a RACH procedure without further assistance from node. Alternatively, the MIB can also supply this M-RACH sequence to the MTC device.

In another aspect (represented by the number "5" enclosed in a circle), the MIB 1501 indicates the resource blocks, reference signal sequence, or search space allocated to a specific M-PDCCH, which should occupy regions of the host system's radiofrequency spectrum that are different from the host system's own (legacy) PDCCH locations. The M-PDCCH supplies control information to the MTC device, including MTC specific SIBs or downlink assignments pointing to the SIBs.

In still another aspect (not shown in the figure in order to avoid an undue amount of clutter), the MIB 1501 includes a direct or indirect reference to a set of different resource blocks and/or MCS allocations among which the device can perform blind decoding in order to find system information mentioned above.

Figure 16:
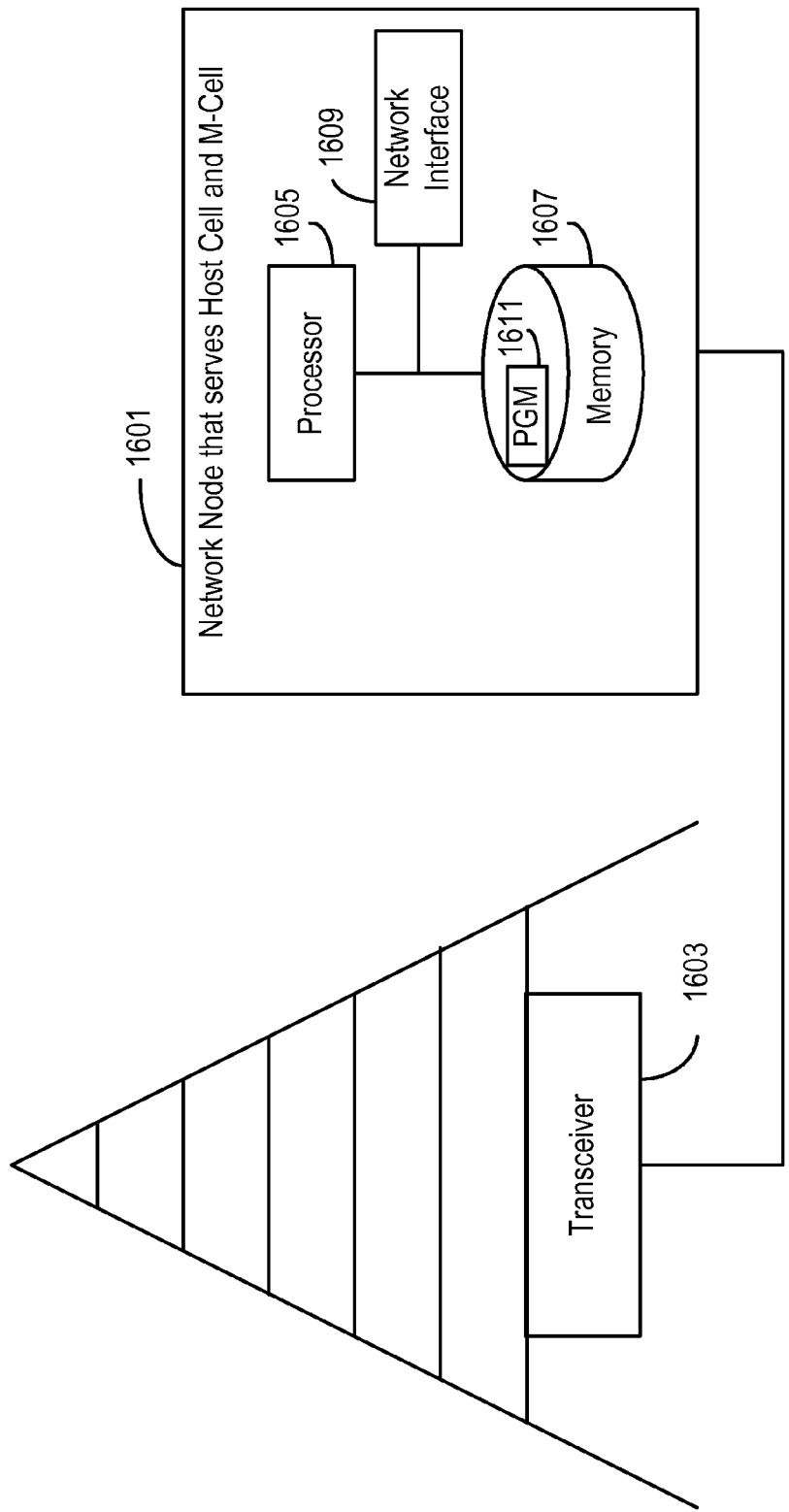
FIG. 16 is a block diagram of system elements for carrying out the various aspects of the invention.

FIG. 16 is a block diagram of system elements for carrying out the various aspects of the invention. In particular, a network node 1601 (e.g., an eNodeB configured to be capable of carrying out the functionality described above) is coupled to a transceiver 1603 that can send and receive signals for serving a host cell as well as one or more M-cells as described above. The network node 1601 includes circuitry configured to carry out any one or any combination of the MTC-related aspects described above with respect to actions taken by the node. Such circuitry could, for example, be entirely hard-wired circuitry (e.g., one or more Application Specific Integrated Circuits—"ASICs"). Depicted in the exemplary embodiment of FIG. 16, however, is programmable circuitry, comprising a processor 1605 coupled to one or more memory devices 1607 (e.g., Random Access Memory, Magnetic Disc Drives, Optical Disk Drives, Read Only Memory, etc.) and to a network interface 1609. The memory device(s) 1607 store program means 1611 (e.g., a set of processor instructions) configured to cause the processor 1605 to control other node elements so as to carry out any of the node-related aspects described above. The memory device(s) 1607 may also store data (not shown) representing various constant and variable parameters as may be needed by the processor 1605 when carrying out its functions such as those specified by the program means 1611. The network interface 1609 allows the node 1601 to communicate with other nodes (not shown) in the communication system.

Figure 17:
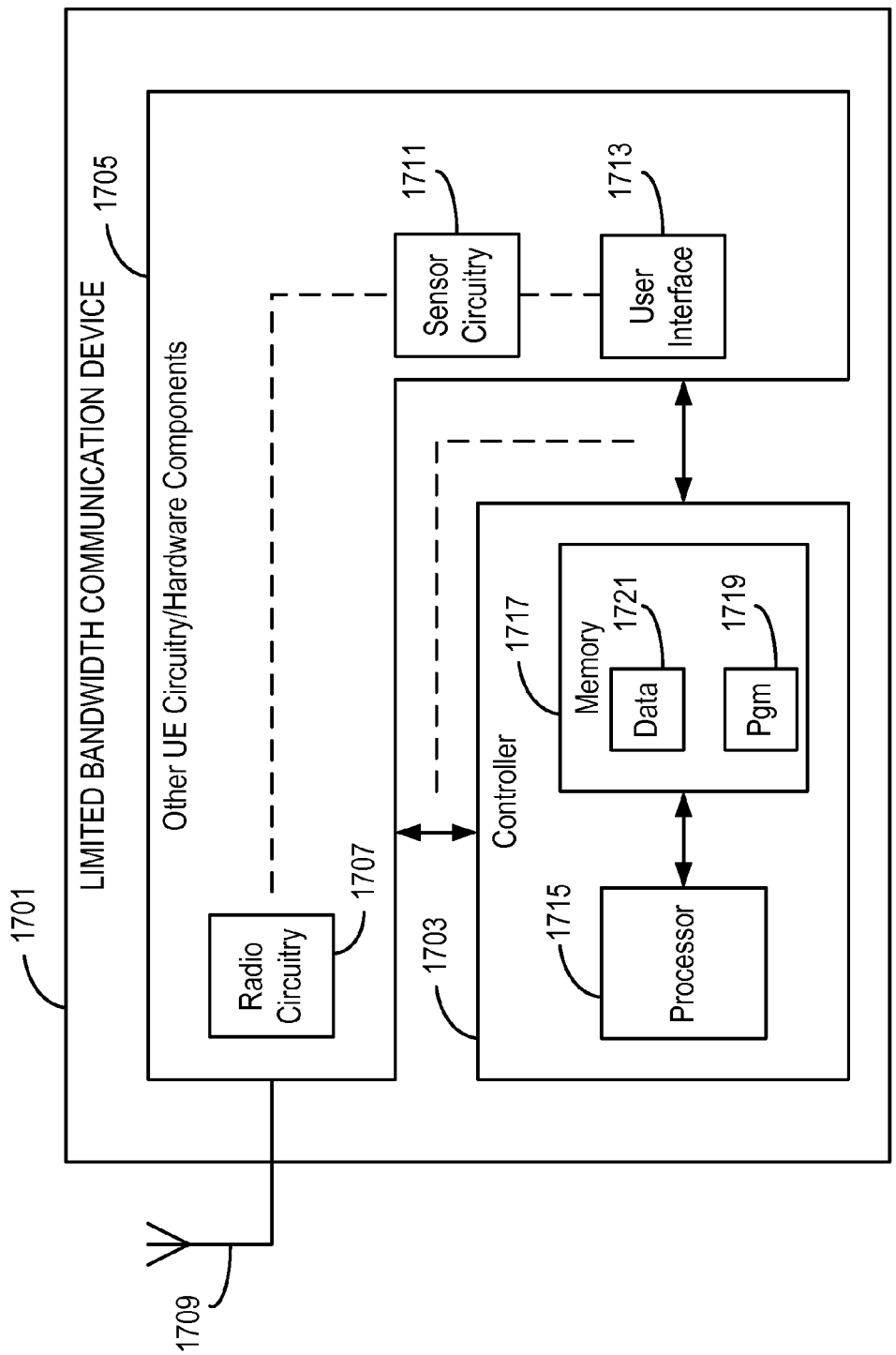
FIG. 17 is a block diagram of a limited bandwidth communication device in accordance with some exemplary embodiments of the invention.

FIG. 17 is a block diagram of a limited bandwidth communication device 1700, such as the MTC device used in the examples described above. The limited bandwidth communication device includes a controller 1703 coupled to other User Equipment (UE) circuitry/hardware components 1705 that enable the limited bandwidth communication device 1701 to perform its application-specific functionality (e.g., operating as a sensor of some sort) and also to operate as a communication device (e.g., to be able to communicate sensor data to a server, and possibly also to receive instructions). The other UE circuitry/hardware components 1705 are generally known in the art, and may include such elements as, for example and without limitation, radio circuitry 1707 coupled to one or more antennas 1709, and (optionally) sensor circuitry 1711 (e.g., temperature sensor, acoustical sensor, magnetic field sensor, etc.). The other UE circuitry/hardware may also include some sort of user interface (e.g., display, keyboard, switch(es)) 1713, although applications that call for use of a limited bandwidth communication device may have very simplistic needs for a user interface 1713 (e.g., a reset switch) or none at all.

The controller 1703 includes circuitry configured to carry out any one or any combination of the MTC-related aspects described above with respect to MTC device actions. Such circuitry could, for example, be entirely hard-wired circuitry (e.g., one or more ASICs). Depicted in the exemplary embodiment of FIG. 17, however, is programmable circuitry, comprising a processor 1715 coupled to one or more memory devices 1717 (e.g., Random Access Memory, Magnetic Disc Drives, Optical Disk Drives, Read Only Memory, etc.). The memory device(s) store program means 1719 (e.g., a set of processor instructions) configured to cause the processor 1715 to control the other UE circuitry/hardware components 1705 so as to carry out any of the MTC device-related aspects described above. The memory 1717 may also store data 1721 representing various constant and variable parameters as may be needed by the processor 1715 when carrying out its functions such as those specified by the program means 1719.

The various aspects of embodiments consistent with the invention as described above provide solutions to the problem in which a communication device supporting only small bandwidths is not able to connect to and operate in a network having a higher bandwidth. The various aspects are applicable both for frequency division duplex (FDD) and time division duplex (TDD) operation.

One benefit of the M-cell concept is that the system may dynamically adjust the number of M-cells in order to match the current balance between the number of served legacy devices and MTC devices. Embodiments such as those illustrated with respect to FIGS. 8 and 9 enable the host system to add M-cells one by one, providing maximum flexibility. In embodiments such as those illustrated with respect to FIGS. 10-12, whole subframes are allocated to M-cells, which provides less granularity, but at the same time potentially enables higher efficiency since no resource elements need to be reserved for legacy (host cell) PDCCH transmission. A system using a combination of these embodiments may take advantage of the merits of both embodiments.

The invention has been described with reference to particular embodiments. However, it will be readily apparent to those skilled in the art that it is possible to embody the invention in specific forms other than those of the embodiment described above.

For example, some of the illustrated exemplary embodiments show the M-cells occupying a bandwidth of a radiofrequency spectrum that is frequency-wise located within a bandwidth of the legacy system's (e.g., an LTE system's) allocated radiofrequency bandwidth. (See, e.g., the M-cell system BW 903 that is frequency-wise located within the Host cell system BW 901.) However, it will further be appreciated that the various illustrated steps and circuitry illustrated in other figures, as well as corresponding text, does not make this an essential feature of embodiments consistent with the invention. To the contrary, the legacy system (including its various control channels) can, in some embodiments, extend over no more than a first bandwidth of a radiofrequency spectrum, while the M-cell entities (including various M-cell control channels, random access channels, etc.) can extend over no more than a second bandwidth of the radiofrequency spectrum (the second bandwidth being smaller than the first bandwidth), without there being any restriction on whether the frequency-wise location of the second bandwidth falls within the frequency-wise location of the first bandwidth. For example, one or more of the various M-cell entities can, in some embodiments, lie wholly outside the radiofrequency band that the legacy communication system is permitted to use. (See, e.g., FIG. 11, which shows M-Cell #m lying within the Host System's Central 72 subcarriers, while other M-Cells, such as M-Cell #1 and M-Cell #n, are frequency-wise located at some distance from the Central 72 subcarriers without any restriction being placed on whether or not they are frequency-wise located within the Host System's frequency-wise bandwidth location.)

Accordingly, the described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of controlling a limited-bandwidth communication device in a cellular communication system, wherein the limited-bandwidth communication device has radio equipment that, when receiving radiofrequency signals, receives no more than a first bandwidth of signals that lie within a radiofrequency spectrum that has a second bandwidth that is wider than the first bandwidth, the method comprising:

operating the radio equipment to perform a cell search procedure by tuning the radio equipment to receive signals in a first region of the radiofrequency spectrum, wherein the first region has a bandwidth that is no greater than the first bandwidth;

after finding a cell in the cellular communication system, tuning the radio equipment to cause the radio equipment to operate in a second region of the radiofrequency spectrum, wherein the second region has a bandwidth that is no greater than the first bandwidth;

while tuned to the second region of the radiofrequency spectrum, operating the radio equipment to receive system information being transmitted by the cellular communication system; and tuning the radio equipment to cause the radio equipment to operate in a third region of the radiofrequency spectrum, wherein at least one of the second and third regions of the radiofrequency spectrum is different from the first region of the radio frequency spectrum, wherein the radiofrequency spectrum includes at least one downlink channel, wherein:

the downlink channel is transmitted by the cellular communication system;

the downlink channel has the second bandwidth that is wider than the first bandwidth;

the second bandwidth of the downlink channel makes the downlink channel not receivable by the limited-bandwidth communication device; and the downlink channel is for reception by a full-bandwidth communication device that has radio equipment for receiving the downlink channel having the second bandwidth within the radiofrequency spectrum.

2. The method of claim 1, wherein after finding the cell in the cellular communication system, tuning the radio equipment to cause the radio equipment to operate in the second region of the radiofrequency spectrum comprises:

receiving information transmitted in the first region of the radiofrequency spectrum, wherein the information directly or indirectly informs the limited-bandwidth communication device about a frequency-wise location of the second region; and tuning the radio equipment to cause the radio equipment to operate in the second region of the radiofrequency spectrum.

3. The method of claim 2, wherein the information additionally directly or indirectly informs the limited-bandwidth communication device about when the system information will be transmitted by the cellular communication system.

4. The method of claim 1, wherein the first and second regions of the radiofrequency spectrum are both located within a region of the radiofrequency spectrum that is allocated for use by the cellular communication system.

5. An apparatus for controlling a limited-bandwidth communication device in a cellular communication system, wherein the limited-bandwidth communication device has radio equipment that, when receiving radiofrequency signals, receives no more than a first bandwidth of signals that lie within a radiofrequency spectrum, the apparatus comprising:

circuitry configured to operate the radio equipment to perform a cell search procedure by tuning the radio equipment to receive signals in a first region of the radiofrequency spectrum, wherein the first region has a bandwidth that is no greater than the first bandwidth;

circuitry configured to tune the radio equipment after finding a cell in the cellular communication system, wherein the tuning causes the radio equipment to operate in a second region of the radiofrequency spectrum, wherein the second region has a bandwidth that is no greater than the first bandwidth;

circuitry configured to, while tuned to the second region of the radiofrequency spectrum, operate the radio equipment to receive system information being transmitted by the cellular communication system; and circuitry configured to tune the radio equipment to cause the radio equipment to operate in a third region of the radiofrequency spectrum, wherein at least one of the second and third regions of the radiofrequency spectrum is different from the first region of the radio frequency spectrum, wherein the radiofrequency spectrum includes at least one downlink channel, wherein:

the downlink channel is transmitted by the cellular communication system;

the downlink channel has the second bandwidth that is wider than the first bandwidth;

the second bandwidth of the downlink channel makes the downlink channel not receivable by the limited-bandwidth communication device; and the downlink channel is for reception by a full-bandwidth communication device that has radio equipment for receiving the downlink channel having the second bandwidth within the radiofrequency spectrum.

6. The apparatus of claim 5, wherein the circuitry configured to tune the radio equipment to cause the radio equipment to operate in the second region of the radiofrequency spectrum comprises circuitry configured to perform, after finding the cell in the cellular communication system, the following:

receiving information transmitted in the first region of the radiofrequency spectrum, wherein the information directly or indirectly informs the limited-bandwidth communication device about a frequency-wise location of the second region; and tuning the radio equipment to cause the radio equipment to operate in the second region of the radiofrequency spectrum.

7. The apparatus of claim 6, wherein the information additionally directly or indirectly informs the limited-bandwidth communication device about when the system information will be transmitted by the cellular communication system.

8. The apparatus of claim 5, wherein the first and second regions of the radiofrequency spectrum are both located within a region of the radiofrequency spectrum that is allocated for use by the cellular communication system.

* * * * *

UNITED STATES PATENT AND TRADEMARK OFFICE
CERTIFICATE OF CORRECTION

PATENT NO. : 9,516,654 B2
APPLICATION NO. : 14/464425
DATED : December 6, 2016
INVENTOR(S) : Axmon et al.

It is certified that error appears in the above-identified patent and that said Letters Patent is hereby corrected as shown below:

Column 10, Line 29, delete "$N_c=12.N_{RB}+1$" and insert -- $N_c=12 \cdot N_{RB}+1$ --, therefor.

Column 10, Line 52, delete "$160 \cdot T_S \approx T_S \approx 5.1 \ \mu s$" and insert -- $160 \cdot T_S \approx 5.1 \mu s$ --, therefor.

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*